United States Patent
Johnson et al.

(10) Patent No.: US 12,413,165 B2
(45) Date of Patent: Sep. 9, 2025

(54) METHOD AND SYSTEM FOR CONTROLLING BRAKING OF AN ELECTRIC MOTOR

(71) Applicant: Deere & Company, Moline, IL (US)

(72) Inventors: Scott C. Johnson, Fargo, ND (US); Andrew W. Kelly, Holy Cross, IA (US); Derek Lehmann, Kindred, ND (US)

(73) Assignee: Deere & Company, Moline, IL (US)

( * ) Notice: Subject to any disclaimer, the term of this patent is extended or adjusted under 35 U.S.C. 154(b) by 119 days.

(21) Appl. No.: 18/351,652

(22) Filed: Jul. 13, 2023

(65) Prior Publication Data

US 2024/0297602 A1   Sep. 5, 2024

Related U.S. Application Data

(60) Provisional application No. 63/507,327, filed on Jun. 9, 2023, provisional application No. 63/488,262, filed on Mar. 3, 2023.

(51) Int. Cl.
*H02P 21/36* (2016.01)
*H02P 21/16* (2016.01)
(Continued)

(52) U.S. Cl.
CPC ............ *H02P 21/36* (2016.02); *H02P 21/16* (2016.02); *H02P 21/18* (2016.02); *H02P 21/22* (2016.02); *H02P 2207/05* (2013.01)

(58) Field of Classification Search
CPC .......... H02P 21/36; H02P 21/16; H02P 21/18; H02P 21/22; H02P 2207/05; H02P 3/22;
(Continued)

(56) References Cited

U.S. PATENT DOCUMENTS

| | | | | |
|---|---|---|---|---|
| 6,121,740 A | * | 9/2000 | Gale | B60L 53/20 318/362 |
| 6,326,762 B1 | * | 12/2001 | Jiang | H02P 21/36 318/807 |
| 2011/0266982 A1 | * | 11/2011 | Rollman | H02P 29/02 318/376 |
| 2017/0354088 A1 | | 12/2017 | Yuki et al. | |
| 2018/0264928 A1 | | 9/2018 | Takaki et al. | |
| 2019/0084107 A1 | | 3/2019 | Yabuguchi | |

(Continued)

FOREIGN PATENT DOCUMENTS

WO   WO 2008031915 A1   3/2008

OTHER PUBLICATIONS

Extended European Search Report and Written Opinion issued in European Patent Application No. 23220006.3 dated Jun. 5, 2024, in 10 pages.

(Continued)

*Primary Examiner* — Bickey Dhakal
(74) *Attorney, Agent, or Firm* — Hanley, Flight & Zimmerman, LLC

(57) ABSTRACT

In accordance with one embodiment, a method of controlling a braking of a rotor of an electric motor comprises operating an electric motor in a first mode at an inefficient operating point or inefficient operating curve of a quadrature-axis current versus a direct-axis current such that the braking of the electric motor occurs at a rate based on a rate proportional to or less than the total available power losses in the motor, the inverter, or both. The electric motor is operated in the first mode until the observed rotor speed of the electric motor is less than or equal to a threshold speed; thereafter a multi-phase short circuit can be applied.

20 Claims, 7 Drawing Sheets

(51) Int. Cl.
*H02P 21/18* (2016.01)
*H02P 21/22* (2016.01)

(58) Field of Classification Search
CPC ........ H02P 29/60; H02P 29/64; H02P 29/662; H02P 29/68; H02P 3/18
See application file for complete search history.

(56) References Cited

U.S. PATENT DOCUMENTS

2020/0055159 A1    2/2020    Sakai et al.
2022/0194232 A1    6/2022    Lu et al.

OTHER PUBLICATIONS

Jiang J. et al, An efficient braking method for controlled AC drives with a diode rectifier front end, Industry Applications Conference, 2000. Conference Record of The 2000 IEEE Oct. 8-12, 2000, vol. 3, Jan. 1, 2000, pp. 1446-1453, XP093165349, DOI: 10.1109/IAS.2000.882074, ISBN: 978-0-7803-6401-1, Retrieved from the Internet: <URL: https://ieeexplore.ieee.org/stampPDF/getPDF.jsp?tp=&arnumber=882074&ref=aHR0cHM6Ly9pZWVleHBsb3JlLmllZWUub3JnL3NlYXJjaC9zZWFyY2hyZXN1bHQuanNwP2FjdGlvbj1zZWFyY2gmbmV3c2VhcmNoPXRydWUmbWF0Y2hCb29sZWFuPXRydWUmcXVlcnlUZXh0PSglMjJBbGwlMjBNZXRhZGF0YSUyMjpBbiUyMGVmZmljaWVudCUyMGJyYWtpbmclMjBtZXRob2QlMjBmb3II>.

Ding Dawei et al, An Antiovervoltage Control Scheme for Electrolytic Capacitorless IPMSM Drives Based on Stator Current Vector Orientation, IEEE Transactions on Industrial Electronics, IEEE Service Center, Piscataway, NJ, USA, vol. 67, No. 5, May 29, 2019, pp. 3517-3527, XP011769953, ISSN: 0278-0046, DOI: 10.1109/TIE.2019.2918497.

* cited by examiner

METHOD AND SYSTEM FOR CONTROLLING BRAKING OF AN ELECTRIC MOTOR

RELATED APPLICATIONS

This document (including the drawings) claims priority and the benefit of the filing date based on U.S. provisional application No. 63/488,262, filed Mar. 3, 2023, and U.S. provisional application No. 63/507,327, filed Jun. 9, 2023, under 35 U.S.C. § 119(e), where the provisional application is hereby incorporated by reference herein.

FIELD

This disclosure relates to a method and system for controlling braking of an electric motor or electric machine.

BACKGROUND

An alternating current electric motor may feature a rotor with permanent magnets and a stator, such as an interior permanent magnet (IPM) motor or an IPM synchronous motor. In accordance with certain prior art, the electric motor may be controlled in a braking mode to bring the rotor to a stop, such as three-phase shorting or regenerative braking, where three-phase shorting converts rotational energy into heat that is dissipated in or from the windings of the electric motor. However, in some prior art three-phase shorting method tends to produce large peak currents in the windings of the electric motor that require inverter designs with higher current ratings and larger motor designs (e.g., larger stator housings or larger cross section of conductor windings) to tolerate anticipated large peak currents and associated increases thermal dissipation. Further, in some prior art, transient electrical energy can arise during a braking mode at direct current terminals of the inverter; the transient electrical energy can damage an energy storage device, such as a capacitor, battery or the combination of an alternator and rectifier. Thus, there is a need for an improved method and system for controlling the braking of a rotor in an electric motor without necessarily increasing a size of the electric motor.

SUMMARY

In accordance with one embodiment, a method of controlling a braking of a rotor of an electric motor, where an inverter is coupled to the electric motor; the method comprises operating an electric motor in a first mode at an inefficient operating point or inefficient operating curve of a quadrature-axis current versus a direct-axis current such that the braking power of the electric motor occurs based on, or at a deceleration rate proportional to, the total available power losses in the motor, the inverter, or both. The electric motor is operated in the first mode until the observed rotor speed of the electric motor is less than or equal to a threshold speed (magnitude). The electric motor is operated in a second mode if the observed rotor speed is less than or equal to the threshold speed (magnitude), by applying multi-phase short (e.g., three-phase short circuit) via the winding terminals of the electric motor to bring the electric motor to a target speed or velocity, such as zero target speed or a stop (e.g., such that the braking energy is fully dissipated in the motor windings, the motor and/or inverter).

DETAILED DESCRIPTION

Figure 1:
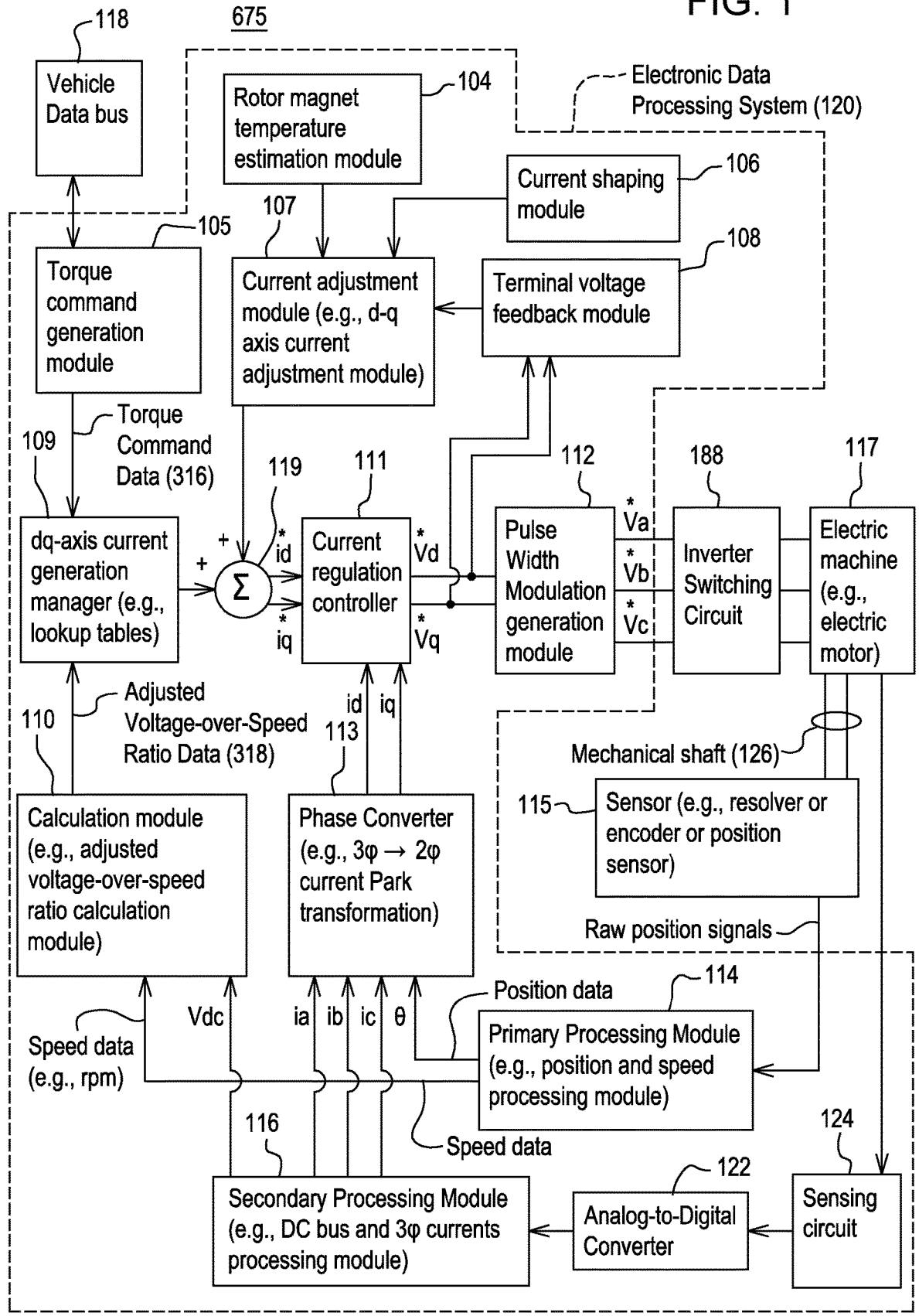
FIG. 1 is a block diagram of one embodiment of a system for controlling braking of an electric motor.

In accordance with one embodiment, FIG. 1 discloses system for controlling an electric machine 117 (e.g., an electric motor or interior permanent magnet (IPM) motor) or another alternating current machine. In one embodiment, the system, aside from the electric machine 117, comprises an electric-machine controller (675, 676) that can drive or provide switching signals to an inverter.

The system comprises electronic modules, software modules, or both. In one embodiment, the electric-machine controller (675, 676) or motor controller comprises an electronic data processing system 120, such as a control module (e.g., software or software instructions executable by an electronic data processor), to support storing, processing or execution of software instructions of one or more software modules. The electronic data processing system 120 is indicated by the dashed lines in FIG. 1 and is shown in greater detail in FIG. 2.

The data processing system 120 is coupled to an inverter circuit 188. The inverter circuit 188 comprises a semiconductor drive circuit that drives or controls switching semiconductors (e.g., insulated gate bipolar transistors (IGBT) or other power transistors) to output control signals for the electric machine 117). In turn, the inverter (e.g., inverter circuit 188) is coupled to the electric machine 117.

The electric machine 117 (e.g., motor) is associated with an optional sensor 115 (e.g., a position sensor, a resolver or encoder position sensor) that is associated with the motor shaft 126 or the rotor. The optional sensor 115 and the electric machine 117 (e.g., motor) are coupled to the data processing system 120 to provide feedback data (e.g., current feedback data, such as $i_a$, $i_b$, $i_c$), raw position signals, among other possible feedback data or signals, for example. Other possible feedback data includes, but is not limited to, winding temperature readings, semiconductor temperature readings of the inverter circuit 188, three phase voltage data, or other thermal or performance information for the electric machine 117 (e.g., motor).

In accordance with one embodiment, a method and system (e.g., electronic data processing system 120 and inverter) is arranged for controlling braking of an electric motor. As used throughout the document, the electric-machine controller (675, 676) may refer to the combination of the electronic data processing system 120 (e.g., and its software modules) and an inverter. In a first mode (e.g., preliminary braking mode or matched-loss-to-braking-power mode), an electric-machine controller (675, 676) controls an inverter and is configured to operate an electric machine (e.g., electric motor) at an inefficient operating point, an inefficient operating region or an inefficient operating curve of a quadrature-axis current versus a direct-axis current that differs from operating of the electric machine in third mode (e.g., motoring mode or normal mode at steady-state at a target torque or target speed of the rotor) with a normal operating point, a normal operating region or a normal operating curve of a quadrature-axis current versus a direct-axis current.

In one example, in a first mode (e.g., preliminary braking mode or matched-loss-to-braking-power mode), the electric-machine controller (675, 676) is configured to operate an electric motor or another electric machine (117, 277) at an inefficient operating point, an inefficient operating region or an inefficient operating curve of a quadrature-axis current versus a direct-axis current such that the braking (power) of the electric motor occurs consistent with: (a) a total available power loss ($P_{loss}$) of the electric machine, or (b) an available power loss component of stator windings of the electric motor ($P_{losswinding}$) that or other available power loss components can be dissipated as thermal energy at least within the one or more stator windings of the electric machine, or both. Further, in the first mode the electric-machine controller (675, 676) is configured to match, limit, or align a braking power of the electric machine (117, 277) to the total available power loss of the electric machine that comprises: a first available power loss component of one or more windings (671, 672, 673) of the electric machine, a second available power loss component of the inverter 550, and a third available power loss component of conductors or electrical cables that couple one or more alternating current terminals of the inverter 550 to the windings (671, 672, 673) of the electric machine (117, 277). Match, limit or align braking power means to make or set the braking power be the proportional to or equal to or less than the total available power loss (e.g., of the electric machine).

In another example, in a first mode (e.g., preliminary braking mode or matched-loss-to-braking-power mode), the electric-machine controller (675, 676) is configured to operate an electric machine (117, 277) at an inefficient operating point, an inefficient operating region or an inefficient operating curve of a quadrature-axis current versus a direct-axis current such that the braking (power) of the electric motor occurs based on, or at a deceleration rate proportional to (e.g., equal to or less than), total available power losses in the electric motor, the inverter, or both during a deceleration period.

In one embodiment, the available power loss component (e.g., $P_{losswinding}$) is a component of the power loss ($P_{loss}$) of the electric machine. Within the electric machine, the power loss ($P_{loss}$) comprises one or more of the following: bearing friction, shaft friction, rotor friction, back electromotive-force, temperature degradation of magnetic force of permanent magnets, field weakening of magnetic flux above a rotor speed threshold, other mechanical losses, and other electrical losses. Efficiency may be defined based on a ratio of electrical input power to the alternating current terminals of the electric motor to the mechanical output power of the electric motor, where the mechanical output power is the numerator and where the electrical input power is the denominator. In other words, the efficiency may be defined as follows:

$E_m = (P_{in} - P_{loss})/P_{in}$, where $E_m$ is the efficiency of the electric motor or electric machine in a motoring mode from 0 to 1; Pin is the sum of electric input energy to motor input terminals for an observation time period; $P_{loss}$ is the power loss of the electric motor or electric machine, or the power loss in the first mode and zero power braking (ZPB). Efficiency, $E_m$, can be expressed as a percentage by multiplying $E_m$ by 100.

In accordance with one aspect of the disclosure, the inefficient operating curve represents a zero power braking curve that is consistent with harnessing or capturing the available power loss component ($P_{losswinding}$), whereas the efficient operating curve represents a normal MTPA (maximum torque per amp or ampere) curve, operating point and operating region, among other alternative normal operating techniques, such as field-oriented control, field-weakening (FW) control or Volts-per-switching-frequency control. In one illustrative example, in the first mode (e.g., preliminary braking mode or matched-loss-to-braking-power mode) the controller (675, 676) or electronic data processor 298 is configured to limit, align or match mechanical braking power of the rotor of the electric machine to the available power loss component or total available power loss of the electric machine, such as the sum of electric machine losses (e.g., friction, thermal, mechanical, electromagnetic, electrical, winding) and inverter losses (e.g., semiconductor conduction losses, semiconductor switching losses, frequency-dependent switching losses, parasitic losses, capacitance-related losses of any semiconductor input and output capacitances, rise-time related loss). In another illustrative example, in the first mode (e.g., preliminary braking mode or matched-loss-to-braking-power mode) the controller (675, 676) or electronic data processor 298 is configured to limit or match mechanical braking power of the rotor to the total available power loss (e.g., electrical/electromagnetic, mechanical, and thermal loss components) of one or more of the following: (a) the electric machine (117, 277) or electric motor, (b) one or more stator windings (671, 672, 673) of the electric machine or electric motor (e.g., referred to as $P_{losswinding}$), (c) inverter switching losses, (d) the conductors, cabling and connectors (e.g., 276) that couple the inverter 550 to the electric machine 277 or electric motor, (e) the capacitor, batteries or energy storage devices coupled to the DC bus (350) or DC link (of the inverter), and/or (f) any inductors, filters or other components coupled to the AC terminals (e.g., phase terminals) of the electric machine 277 or electric motor.

Further, in the first mode (e.g., preliminary braking mode) the controller (675, 676) or data processor 298 is configured to simultaneously, or serially, sink, absorb or direct rotational mechanical energy to: (1) total available power loss in the electric machine 277, alone or in combination with the inverter, and (2) power regeneration by directing some electrical energy to the direct current (DC) bus or components coupled to the direct current bus, such as capacitor, an ultracapacitor, a battery, a battery bank, a generator, or an alternator coupled to a rectifier. The power regeneration, which is directed, sunk or absorbed by the one or more components coupled to the DC bus, such as the generator or alternator, is limited based on or proportional to the load on the generator or alternator or load on the electrical system, where the load can be measured based on the power capacity or current capacity and the observed capacity utilization of the one or more components coupled to the DC bus. Accordingly, through ancillary power regeneration the controller (675, 676) or data processor can enhance braking that is otherwise limited by the total available power loss.

Further, for example, the controller (675, 676) is configured to apply a slew rate to the commanded direct-axis current and commanded quadrature axis current in the first mode (e.g., preliminary braking mode or matched-loss-to-braking-power mode, which can use a zero power braking curve), such as a slew rate between 1000 revolutions per minute/second to 3000 revolutions per minute/second of the rotor speed. The slew rate is generally defined as the rate of change of the signal current, or the corresponding voltage of the signal, such the commanded d-q axes current or the corresponding commanded d-q axes voltage that is applied to the driver (e.g., pulse width modulation driver or PWM generation module 112) that is coupled to the inverter (e.g., switching circuit that controls the rotation of the rotor of the electric machine). In the first mode (e.g., preliminary braking mode or matched-loss-to-braking-power mode), a greater slew rate of the zero power braking curve or first mode is generally proportional to or coincident with a shorter stopping time of the rotor of the electric motor.

In any of the equations referenced throughout this document and appended claims, the terms are defined as follows, where an asterisk (*) can modify the below current and voltages to mean commanded voltages and an torque to mean commanded torque:

MTPA means Maximum torque per amp or ampere;
FW means field weakening;
LPF means low-pass filter;
fbw or $f_{bw}$ means the bandwidth of LPF, such as the −3 dB bandwidth or bandwidth measured at −3 dB below peak amplitude bandwidth;
Ld or $L_d$ means d-axis (direct-axis) inductance;
Lq or $L_q$ means q-axis (quadrature-axis) inductance;
Id or $I_d$ means d-axis (direct-axis) current;
Iq or $I_q$ means q-axis (quadrature-axis) current (e.g., expressed in amps);
Id* or $I_d^*$ means commanded d-axis (direct-axis) current;
Iq* or $I_q^*$ means commanded q-axis (quadrature-axis) current;
Vd or $V_d$ means d-axis (direct-axis) voltage (e.g., expressed in volts);
Vq or $V_q$ means q-axis (quadrature-axis) voltage;
Vd* or $V_d^*$ means d-axis (direct-axis) voltage;
Vq* or $V_q^*$ means q-axis (quadrature-axis) voltage;
da, or $d_a$ or $V_a$ means the voltage at a first phase terminal of the electric machine (e.g., expressed in root mean square (RMS) volts);
db or $d_b$ or $V_b$ means the voltage at a second phase terminal of the electric machine;
dc or $d_c$ or $V_c$ means the voltage at a third phase terminal of the electric machine;
Rs or $R_s$ means stator resistance (e.g., expressed in ohms);
p means the number of machine poles, whereas P or $P_p$ means number of pole pairs;
λf or $\lambda_f$ means the back emf constant (e.g., expressed in amps);
futil or $f_{util}$ means the DC (direct current) bus utilization factor;
Vdc of Vdc means DC bus voltage (e.g., expressed in DC volts);
ωe or $\omega_e$ means electrical speed in radians per second (rad/s);
ωm or $\omega_m$ or Ω means mechanical speed (e.g., of the rotor or shaft of the electric machine) in radians per second (rad/s);
T* means raw or initial commanded torque (e.g., expressed in Newton-meters);
Tfinal* or $T_{final*}$ means final commanded torque;
Test means the estimated torque determined based on the operating point or operating region of the commanded direct-axis current and commanded quadrature-axis current in the direct-quadrature (d-q) axis plane;
Tem means the estimated measured torque observed at the electric machine terminals; and
err is an error between a commanded torque and an estimate torque.

In accordance with another aspect of the disclosure, the controller (675, 676) is configured to operate the electric motor in the first mode (e.g., preliminary braking mode or matched-loss-to-braking-power mode) until a rotational speed of a rotor of the electric motor is less than or equal to a threshold speed (magnitude). For example, the controller (675, 676) is configured to operating an electric motor in a first mode at an inefficient operating point or inefficient operating curve of a quadrature-axis current versus a direct-axis current such that the braking of the electric motor occurs based on, or at a deceleration rate proportional to (e.g., equal to or less than), total available power losses in the electric motor, the inverter, or both during a deceleration period. If the rotational speed is less than or equal to the threshold speed (magnitude), then the controller (675, 676) or electronic data processor (264, 298) is configured to operate (or transition) the electric motor in a second mode (e.g., secondary braking mode or final braking mode) with multi-phase shorting mode (e.g., three-phase shorting mode).

For example, in the second mode (e.g., secondary braking mode or final braking mode) the controller (675, 676) is configured to operate the electric machine or electric motor by applying a multi-phase short (e.g., by activating the low-side switches 283 (in FIG. 5A, FIG. 5B or both)) of each phase of the inverter 550 continuously and collectively for a target duration or time period, such that: (a) an electrical path from each phase winding to one or more other phase windings is provided for the duration of the shorting of the AC phase signal to dissipate the electrical energy as thermal energy in one or more phase windings, or (b) an electrical path from each phase winding (671, 672, 673) to optional ground (connection) 351, a negative DC bus terminal or chassis ground (in FIG. 5A, FIG. 5B or both) to dissipate the electrical energy as thermal energy in one or more phase windings. In some embodiments, the target duration has an upper time limit or maximum, whereas in other embodiments the target duration has maximum, minimum, lower time limit, upper time limit or a range of target durations determined or estimated to be proportional to the operational speed or threshold speed magnitude, where any target duration, maximum, minimum, lower time limit, upper time limit or a range of target durations is stored in the data storage device as a look-up table, a file, an inverted file or a database, or as one or more equations.

In the second mode, the short-circuit currents that flow in one or more phases of the windings oppose the mechanical rotation of the rotor with an electromotive force or braking force (e.g., until the electrical energy in the phase windings is dissipated as thermal energy). After the second mode is completed, it is possible that the rotor or motor shaft is free to rotate with the application of an external rotational force to the rotor or motor shaft when the motor or electric machine is at rest, unless other braking features are used.

Although the controller (675, 676) or electronic data processor (264, 298) can provide the multi-phase shorting by activating (e.g., the switched terminals of) the low-side switches 283 of each phase (279, 280, 281) of the inverter 550 continuously and collectively for a continuous target duration, in alternate embodiments, the controller (675, 676) can provide the multi-phase shorting by activating (e.g., by selectively or intermittently activating or by pulsing) the low-side switches 283 of each phase of the inverter in a sequence to provide the short-circuit connection of an AC signal: (a) between one or more windings (671, 672, 673) of the electric machine (117, 277), or (b) to ground potential (e.g., DC bus or negative DC bus 350 at optional ground connection 351), or both, for one or more pulse durations during an intermittent target duration. For instance, the braking force can be controlled or reduced (e.g., to slow instead of stopping the rotation of the rotor or shaft of the electric machine) by pulsing or modulating the low-side switches. Further, the electronic data processor 298 or controller (675, 676) is configured to activate or pulse in sequence each low-side switch 283 among the low-side switches 283 to bring the electric motor to a target speed magnitude or target velocity of the rotor or motor shaft.

In the second mode, the multi-phase short can be applied to the alternating current (AC) winding terminals (e.g., stator winding terminals for one or more phases (279, 280, 281), such as phase A winding, a phase B winding and a phase C winding) of the motor or electric machine to bring the rotor or shaft of the electric machine (117, 277) or electric motor to a target speed or velocity, such as zero target speed, a slower rotational speed, or a rotational stop (e.g., within a target time period based on a maximum operational speed). Meanwhile, the controller (675, 676) or data processor (264, 298) is configured to control the respective high-side switch 282 or all high-side switches 282 of the inverter 550 to have open switched terminals, where the switched terminals are the emitter and collector for a transistor and the switched terminals are the source and drain for a field-effect transistor.

Figure 5A:
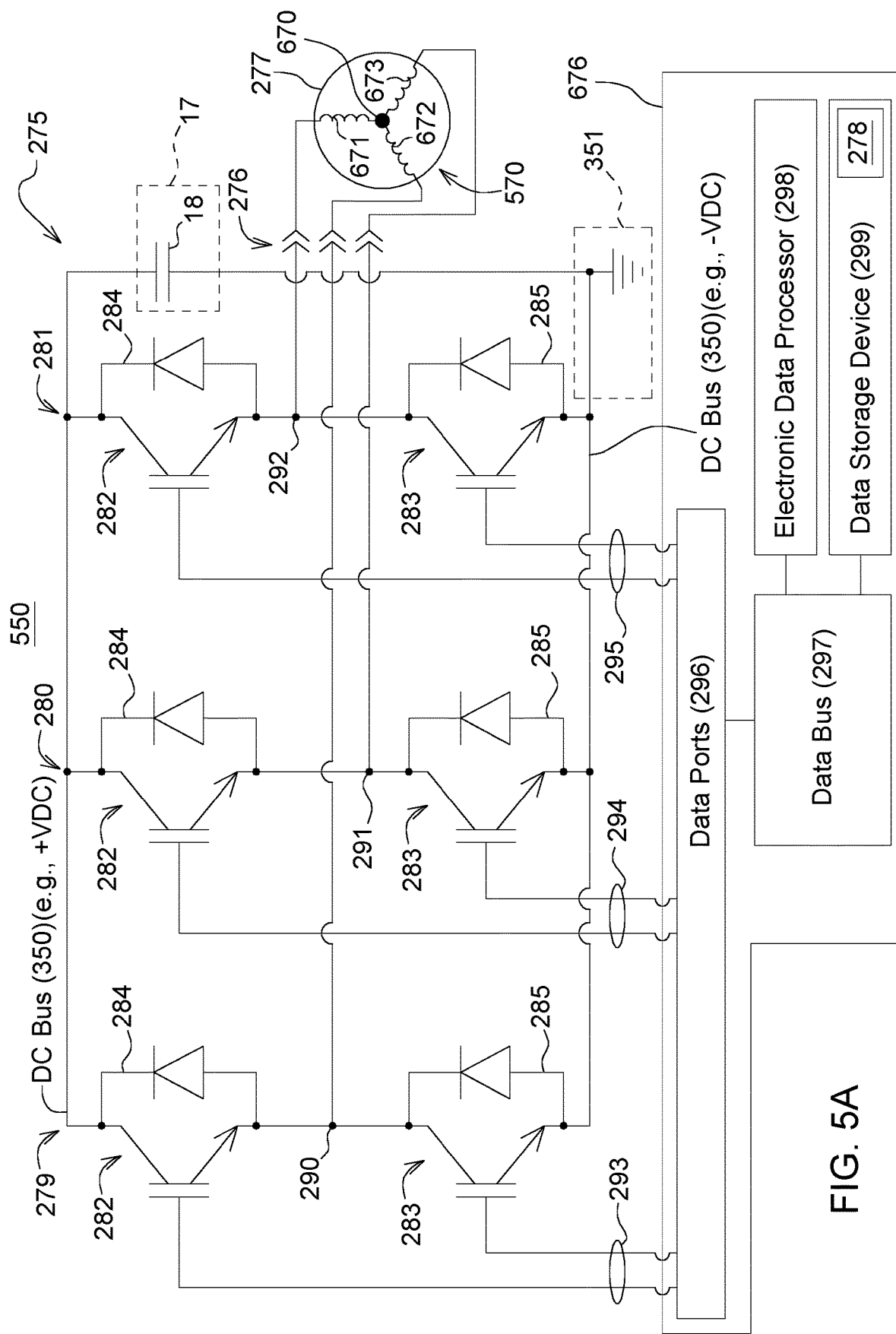
FIG. 5A is a block diagram of another embodiment of a system for controlling braking of an electric machine, which illustrates the inverter in greater detail.
Figure 5B:
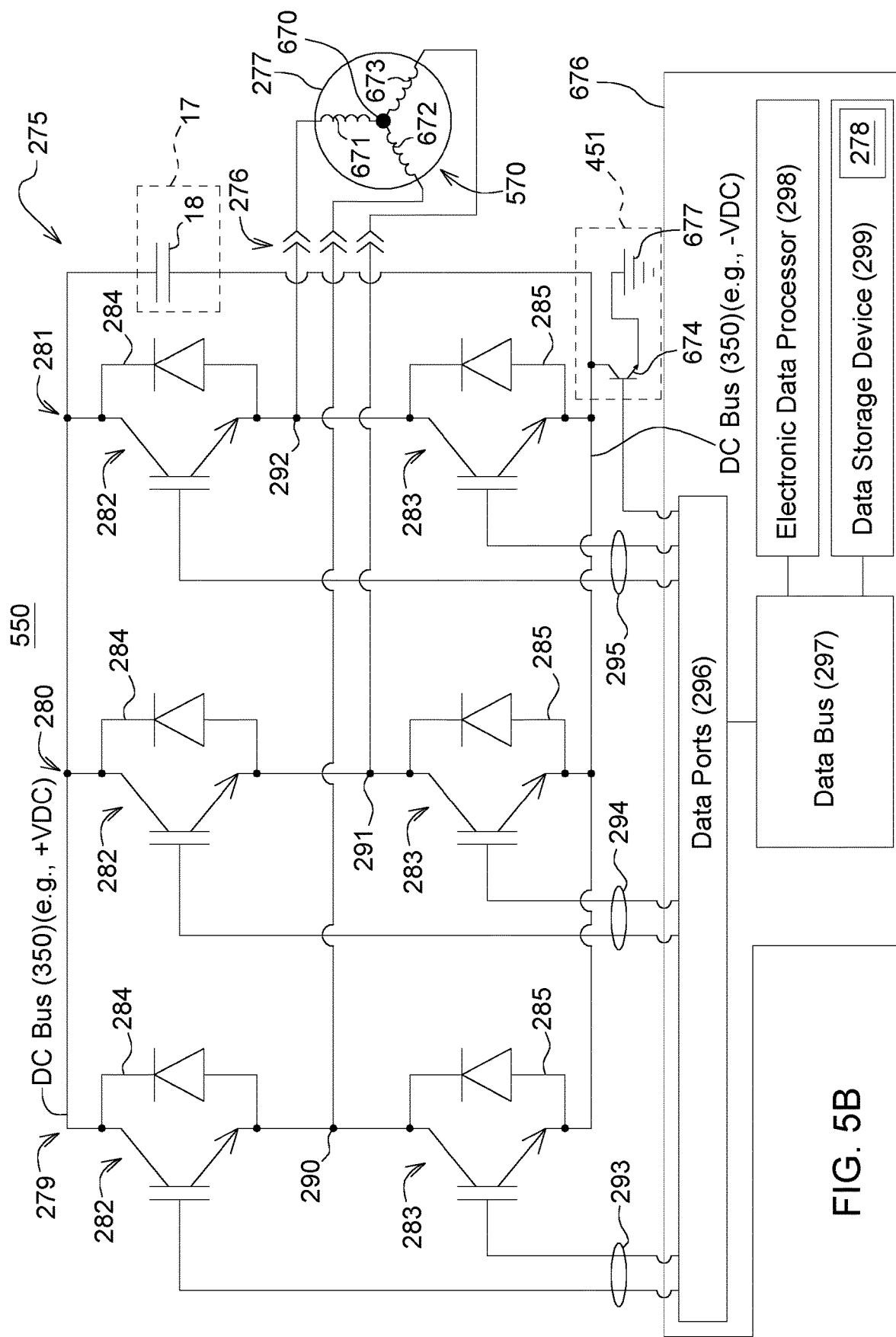
FIG. 5B is a block diagram of still another embodiment of a system for controlling braking of an electric machine, which illustrates the inverter in greater detail.

In one embodiment, as illustrated in FIG. 5A and FIG. 5B, the three-phase windings (672, 673, 671) of the electric machine 277 or electric machine 117 (e.g., motor) are configured as a star connection 570 or WYE connection 570 with a neutral terminal 670, where there is a lower alternating current (AC) voltage between any single (hot) phase terminal (290, 291, 292) and the neutral terminal 670, and where there is a higher AC voltage between any two or pair of the phase terminals (290, 291, 292), among the phase A, phase B, and phase C terminals. Each of the phase terminals (290, 291, 292) is coupled to a respective winding (672, 673, 671) of the electric machine 277.

In an alternate embodiment, the three-phase windings of the electric machine 277 or the electric machine 117 (e.g., motor) are configured as a delta connection or like a triangle of windings with hot terminals or taps at the vertices, where delta configuration AC output voltage between any two hot terminals, and where there is not neutral or common terminal for the delta configuration.

The multi-phase shorting (e.g., three-phase shorting) process or arrangement or second mode may be conducted in accordance with various procedures or examples, which may be applied separately or cumulatively.

Under a first example, (e.g., in the second mode, secondary braking mode or final braking mode) the multi-phase shorting (e.g., three-phase shorting) comprises the field-oriented-control module, driver or electronic data processor (264, 298) configured to activate (e.g., continuously) the low-side switches 283 of each phase (279, 280, 281) of the inverter 550 or inverter switching module in sequence or collectively and simultaneously such that: (a) an electrical path from each phase winding to one or more other phase windings is provided (e.g., via the low-side switches 283 and via one or more protection diodes 285) that can dissipate some portion of its energy in such phase winding (e.g., resistance or resistance and reactance) as thermal energy and (b) an electrical path from each phase winding to ground (e.g., 351) is switchably provided for signal (e.g., continuous signal or signal pulse) that can dissipate some portion of its energy in such phase winding as thermal energy. Further, in the second mode the field-oriented control module, driver or electronic data processor configured to deactivate or open (e.g., simultaneously with the low-side switches 283) the switched terminals of the high-side switches 284.

Under a second example, (e.g., in the second mode, secondary braking mode or final braking mode) the three-phase shorting comprises the field-oriented control module, driver or electronic data processor configured to activate or pulse the low-side switches 283 of each phase (279, 280, 281) of the inverter 550 in sequence to bring the electric motor to a target speed or velocity, such as zero target speed or a stop within a target time period based on a maximum operational speed. Further, in the second mode the field-oriented control module, driver or electronic data processor configured to deactivate or open (e.g., simultaneously with the low-side switches 283) the switched terminals of the high-side switches 284. In some embodiments of the second example, alone or in combination with the multi-phase shorting, the switches may also be switched to divert electrical energy to charge the capacitor (e.g., DC bus capacitor) or another energy storage device coupled to the DC bs 350.

Under a third example, (e.g., in the second mode, secondary braking mode or final braking mode) the multi-phase shorting or three-phase shorting comprises the field-oriented control module, driver or electronic data processor (264, 298) configured to activate (e.g., continuously) or pulse one or more switches (282, 283) of the inverter 550 such that: (a) the commanded torque is slowing the motor shaft or rotor, such as where the commanded torque is opposing or negative (e.g., for one or more sampling intervals) with respect to the observed torque (e.g., positive observed torque) of the rotor or shaft of the electric machine (277, 117), and/or (b) the commanded torque set to zero (e.g., for one or more sampling intervals), such that the electrical or mechanical rotational speed approaches zero during a slowing time or stopping time. In one embodiment, each sampling interval may have a period of approximately 1 Hz to approximately 10 KHz.

Under a fourth example, (e.g., in the second mode, secondary braking mode or final braking mode) the multi-phase shorting (e.g., three-phase shorting) comprises the field-oriented-control module, driver or electronic data processor (264, 298) configured to activate (e.g., continuously) the high-side switches 282 of each phase (279, 280, 281) of the inverter 550 or inverter switching module in sequence or collectively and simultaneously such that an electrical path from each phase winding to one or more other phase windings can dissipate electrical energy in the resistance (e.g., or resistance and reactance) of one or more windings (e.g., via the high-side switches 282 and via one or more protection diodes 284, where the three-phase windings are configured as a star connection or WYE connection with a neutral terminal, or where the three-phase windings are configured as a delta connection, where both the start connection configuration or the delta connection configurations provide an AC output voltage between any two hot terminals). Further, in the second mode the field-oriented control module, driver or electronic data processor configured to deactivate or open (e.g., simultaneously with the low-side switches 283) the switched terminals of the high-side switches 284.

In one embodiment, the torque command generation module 105 is coupled to a d-q axis current generation manager 109 (e.g., d-q axis current generation look-up tables). D-q axis current refers to the direct axis current and the quadrature axis current as applicable in the context of vector-controlled alternating current machines, such as the electric machine 117 (e.g., motor). The output of the d-q axis current generation manager 109 and the output of a current adjustment module 107 (e.g., d-q axis current adjustment module 107) are fed to a summer 119. In turn, one or more outputs (e.g., direct axis current data ($i_d$*) and quadrature axis current data ($i_q$*)) of the summer 119 are provided or coupled to a current regulation controller 111.

The current regulation controller 111 is capable of communicating with the pulse-width modulation (PWM) generation module 112 (e.g., space vector PWM generation module). The current regulation controller 111 receives respective d-q axis current commands (e.g., $i_d$* and $i_q$*) and actual d-q axis currents (e.g., $i_d$ and $i_q$) and outputs corresponding d-q axis voltage commands (e.g., $v_d$* and $v_q$* commands) for input to the PWM generation module 112.

In one embodiment, the PWM generation module 112 converts the direct axis voltage and quadrature axis voltage data from two phase data representations into three phase representations (e.g., three phase voltage representations, such as $v_a$*, $v_b$* and $v_c$*) for control of the electric machine 117 (e.g., motor), for example. Outputs of the PWM generation module 112 are coupled to the inverter 188.

The inverter circuit 188 comprises power electronics, such as switching semiconductors to generate, modify and control pulse-width modulated signals or other alternating current signals (e.g., pulse, square wave, sinusoidal, or other waveforms) applied to the electric machine 117 (e.g., motor). The PWM generation module 112 provides inputs to a driver stage within the inverter circuit 188. An output stage of the inverter circuit 188 provides a modulated signal, a pulse-width modulated signal, a pulse-width modulated voltage waveform, a voltage signal, or other alternating current signal for control of the motor. In one embodiment, the inverter 188 is powered by a direct current (DC) voltage bus.

The electric machine 117 (e.g., motor) is associated with an optional sensor 115 (e.g., a resolver, encoder, speed sensor, or a position sensor or sensors) that estimates at least one of an angular position of the motor shaft 126, a speed or velocity of the motor shaft 126, and a direction of rotation of the motor shaft 126. The optional sensor 115 may be mounted on or integral with the motor shaft 126. The output of the optional sensor 115 is capable of communication with the primary processing module 114 (e.g., position and speed processing module). In one embodiment, the optional sensor 115 may be coupled to an analog-to-digital converter (not shown) that converts analog position data or velocity data to digital position or velocity data, respectively. In other embodiments, the optional sensor 115 (e.g., digital position encoder) may provide a digital data output of position data or velocity data for the motor shaft 126 or rotor.

A first output (e.g., position data and speed data for the electric machine 117) of the primary processing module 114 is communicated to the phase converter 113 (e.g., three-phase to two-phase current Park transformation module) that converts respective three-phase digital representations of measured current into corresponding two-phase digital representations of measured current. A second output (e.g., speed data) of the primary processing module 114 is communicated to the calculation module 110 (e.g., adjusted voltage over speed ratio module). In one embodiment, the calculation module 110 may comprise a speed error estimator.

An input of a sensing circuit 124 is coupled to terminals of the electric machine 117 (e.g., motor) for sensing at least the measured three-phase currents and a voltage level of the direct current (DC) bus (e.g., high voltage DC bus which may provide DC power to the inverter circuit 188). An output of the sensing circuit 124 is coupled to an analog-to-digital converter 122 for digitizing the output of the sensing circuit 124. In turn, the digital output of the analog-to-digital converter 122 is coupled to the secondary processing module 116 (e.g., Direct current (DC) bus and three phase current processing module). For example, the sensing circuit 124 is associated with the electric machine 117 (e.g., motor) for measuring three phase currents (e.g., current applied to the windings of the electric machine 117, back EMF induced into the windings, or both).

Certain outputs of primary processing module 114 and the secondary processing module 116 feed the phase converter 113. For example, the phase converter 113 may apply a Park transformation or other conversion equations (e.g., certain conversion equations that are suitable are known to those of ordinary skill in the art) to convert the measured three-phase representations of current into two-phase representations of current based on the digital three-phase current data from the secondary processing module 116 and position data from the optional sensor 115. The output of the phase converter 113 module is coupled to the current regulation controller 111.

Other outputs of the primary processing module 114 and the secondary processing module 116 may be coupled to inputs of the calculation module 110 (e.g., adjusted voltage over-speed ratio calculation module). For example, the primary processing module 114 may provide speed data (e.g., motor shaft 126 revolutions per minute), whereas the secondary processing module 116 may provide a measured level of direct current voltage (e.g., on the direct current (DC) bus of a vehicle). The direct current voltage level on the DC bus that supplies the inverter circuit 188 with electrical energy may fluctuate or vary because of various factors, including, but not limited to, ambient temperature, battery condition, battery charge state, battery resistance or reactance, fuel cell state (if applicable), motor load conditions, respective motor torque and corresponding operational speed, and vehicle electrical loads (e.g., electrically driven air-conditioning compressor). The calculation module 110 is connected as an intermediary between the secondary processing module 116 and the dq-axis current generation manager 109. The output of the calculation module 110 can adjust or impact current commands generated by the d-q axis current generation manager 109 to compensate for fluctuation or variation in direct current bus voltage, among other things.

The rotor magnet temperature estimation module 104, the current shaping module 106, and the terminal voltage feedback module 108 are coupled to or are capable of communicating with the dq-axis current adjustment module 107. In turn, the d-q axis current module 107 may communicate with the dq-axis current generation manager or the summer 119.

The rotor magnet temperature module 104 estimates or determines the temperature of the rotor permanent magnet or magnets. In one embodiment, the rotor magnet temperature estimation module 104 may estimate the temperature of the rotor magnets from internal control variables calculation, one or more sensors located on the stator, in thermal communication with the stator, or secured to the housing of the electric machine 117 (e.g., motor).

In one alternate embodiment, the rotor magnet temperature estimation module 104 may be replaced by or may estimate the temperature of the rotor magnets from one or more sensors located on the stator, in thermal communication with the stator, or secured to the housing of the electric machine 117 (e.g., motor).

In another alternative embodiment, the rotor magnet temperature estimation module 104 may be replaced with a temperature detector (e.g., a thermistor or infrared thermal sensor coupled to a wireless transmitter) mounted on the rotor or the magnet, where the detector provides a signal (e.g., wireless signal) indicative of the temperature of the magnet or magnets.

In one embodiment, the method or system may operate in the following manner. The torque command generation module 105 receives an input control data message, such as a speed control data message, a voltage control data message, or a torque control data message, over a vehicle data bus 118. The torque command generation module 105 converts the received input control message into torque control command data 316.

The d-q axis current generation manager 109 selects or determines the direct axis current command data and the quadrature axis current command data associated with respective torque control command data and respective detected motor shaft 126 speed data. For example, the d-q axis current generation manager 109 selects or determines the direct axis current command, the quadrature axis current command by accessing one or more of the following: (1) a look-up table, database or other data structure that relates respective torque commands to corresponding direct and quadrature axes currents, (2) a set of quadratic equations or linear equations that relate respective torque commands to corresponding direct and quadrature axes currents, or (3) a set of rules (e.g., if-then rules) that relates respective torque commands to corresponding direct and quadrature axes currents. The optional sensor 115 on the electric machine 117 (e.g., motor) facilitates provision of the detected speed data for the motor shaft 126, where the primary processing module 114 may convert position data provided by the optional sensor 115 into speed data.

The current adjustment module 107 (e.g., d-q axis current adjustment module) provides current adjustment data to adjust the direct axis current command data and the quadrature axis current command data based on input data from the rotor magnet temperature estimation module 104, the current shaping module 106, and the terminal voltage feedback module 108.

The current shaping module 106 may determine a correction or preliminary adjustment of the quadrature axis (q-axis) current command and the direct axis (d-axis) current command based on one or more of the following factors: torque load on the electric machine 117 (e.g., motor) and speed of the electric machine 117, for example. The rotor magnet temperature estimation module 104 may generate a secondary adjustment of the q-axis current command and the d-axis current command based on an estimated change in rotor temperature, for example. The terminal voltage feedback module 108 may provide a third adjustment to d-axis and q-axis current based on a controller (675, 676) voltage command versus voltage limit. The current adjustment module 107 may provide an aggregate current adjustment that considers one or more of the following adjustments: a preliminary adjustment, a secondary adjustment, and a third adjustment.

In one embodiment, the electric machine 117 may comprise an interior permanent magnet (IPM) machine or an IPM synchronous machine (IPMSM), such as an electric motor. An IPMSM has many favorable advantages compared with conventional induction machines or surface mounted permanent magnet (SMPM) machines such as high efficiency, high power density, wide constant power operating region, and maintenance free, for instance.

The optional sensor 115 (e.g., shaft or rotor speed detector) may comprise one or more of the following: a direct current motor, an optical encoder, a magnetic field sensor (e.g., Hall Effect sensor), magneto-resistive sensor, and a resolver (e.g., a brushless resolver). In one configuration, the optional sensor 115 comprises a position sensor, where position data and associated time data are processed to determine speed or velocity data for the motor shaft 126. In another configuration, the optional sensor 115 comprises a speed sensor, or the combination of a speed sensor and an integrator to determine the position of the motor shaft. The optional sensor 115 may be indicated as optional by showing the block in dashed lines, for example.

In yet another configuration, the optional sensor 115 comprises an auxiliary, compact direct current generator that is coupled mechanically to the motor shaft 126 of the electric machine 117 (e.g., motor) to determine speed of the motor shaft 126, where the direct current generator produces an output voltage proportional to the rotational speed of the motor shaft 126. In still another configuration, the optional sensor 115 comprises an optical encoder with an optical source that transmits a signal toward a rotating object coupled to the shaft 126 and receives a reflected or diffracted signal at an optical detector, where the frequency of received signal pulses (e.g., square waves) may be proportional to a speed of the motor shaft 126. In an additional configuration, the optional sensor 115 comprises a resolver with a first winding and a second winding, where the first winding is fed with an alternating current, where the voltage induced in the second winding varies with the frequency of rotation of the rotor.

Figure 2:
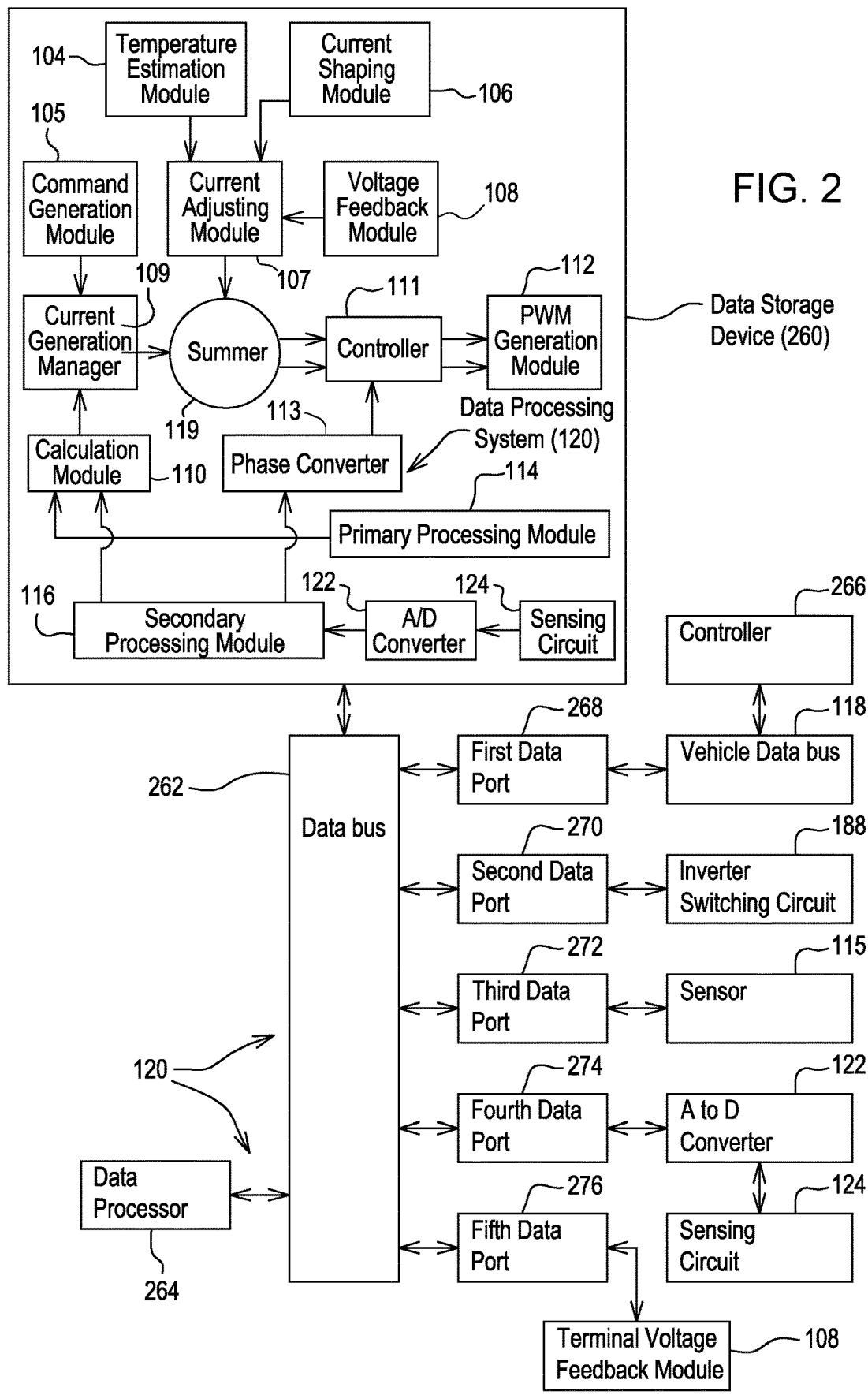
FIG. 2 is a block diagram of an electronic data processing system consistent with FIG. 1.

In FIG. 2, the electronic data processing system 120 comprises an electronic data processor 264, a data bus 262, a data storage device 260, and one or more data ports (268, 270, 272, 274 and 276). The data processor 264, the data storage device 260 and one or more data ports are coupled to the data bus 262 to support communications of data between or among the data processor 264, the data storage device 260 and one or more data ports.

In one embodiment, the data processor 264 may comprise an electronic data processor, a microprocessor, a microcontroller, a programmable logic array, a field programmable gate array (FPGA), a logic circuit, an arithmetic logic unit, an application specific integrated circuit (ASIC), a digital signal processor (DSP), a proportional-integral-derivative (PID) controller, or another data processing device.

The data storage device 260 may comprise any magnetic, electronic, or optical device for storing data. For example, the data storage device 260 may comprise an electronic data storage device, an electronic memory, non-volatile electronic random access memory, one or more electronic data registers, data latches, a magnetic disc drive, a hard disc drive, an optical disc drive, or the like.

As shown in FIG. 2, the data ports comprise a first data port 268, a second data port 270, a third data port 272, a fourth data port 274 and a fifth data port 276, although any suitable number of data ports may be used. Each data port may comprise a transceiver and buffer memory, for example. In one embodiment, each data port may comprise any serial or parallel input/output port.

In one embodiment as illustrated in FIG. 2, the first data port 268 is coupled to the vehicle data bus 118. In turn, the vehicle data bus 118 is coupled to the controller 266. In one configuration, the second data port 270 may be coupled to the inverter circuit 188; the third data port 272 may be coupled to the optional sensor 115; the fourth data port 274 may be coupled to the analog-to-digital converter 122; and the fifth data port 276 may be coupled to the terminal voltage feedback module 108. The analog-to-digital converter 122 is coupled to the sensing circuit 124.

In one embodiment of the data processing system 120, the torque command generation module 105 is associated with or supported by the first data port 268 of the electronic data processing system 120. The first data port 268 may be coupled to a vehicle data bus 118, such as a controller area network (CAN) data bus. The vehicle data bus 118 may provide data bus messages with torque commands to the torque command generation module 105 via the first data port 268. The operator of a vehicle may generate the torque commands via a user interface, such as a throttle, a pedal, a controller 266, or other control device.

Figure 3:
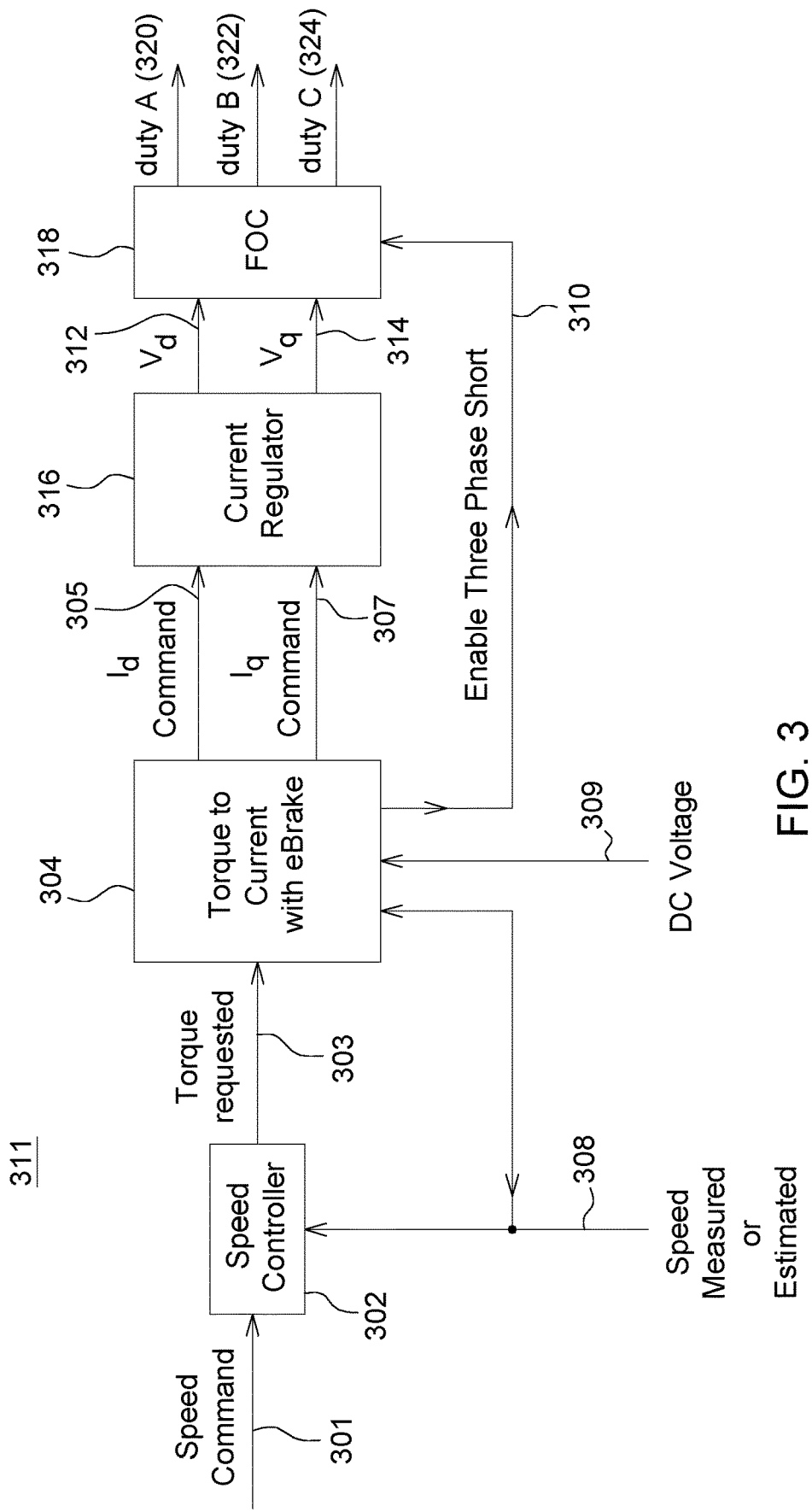
FIG. 3 is a block diagram of a system for controlling braking of an electrical motor.

FIG. 3 is a block diagram of a system 311, such as an electric machine controller (e.g., 675, 676) for controlling braking of an electrical motor or electric machine (117, 277) of FIG. 1, FIG. 5A or FIG. 5B. For example, the blocks and modules of FIG. 3 may comprise software instructions or software that can be stored in a data storage device (260, 299) for execution by an electronic data processor (264, 298), where the arrows or lines indicate logical, virtual or physical communication (e.g., system calls, dynamic linking, static linking, pipes, sockets or shared addresses, stack, registers, accumulators, or data storage locations) of data between the modules or blocks.

In FIG. 3, the speed controller 302 is coupled to the torque-to-current module 304 with electric braking. In turn, the torque-to-current module 304 is coupled to the current regulator 316. The current regulator 316 is configured to communicate with the field-oriented control module 318.

In one embodiment, the speed controller 302 or the current regulator 316 may comprise a proportional integral controller, a proportional integral-derivative (PID) controller, a controller, or control module. The proportional integral controller may provide an output (e.g., torque requested or commanded torque 303) that is proportional to a linear combination of the input and a time integral of the input (e.g., speed command 301). For example, a proportion integral controller may provide an output signal that is proportional to the rate of change to the input signal, where the input signal may or may not include feedback signal from the output signal. Similarly, the proportional integral derivative controller may provide an output (e.g., torque requested or commanded torque 303) in which the output is proportional to a linear combination of the input (e.g., speed command 301), the time integral of the input and the time-rate of change of the input. In some embodiments, the speed controller 302, the current regulator 316, or both, may be expressed mathematically as one or more transfer functions of the input(s) and the output(s).

The speed controller 302 has a speed command 301 as a first input and an observed rotor speed 308 as a second input. The observed speed may comprise the observed rotor speed that is estimated by block 124 of FIG. 1 or the observed rotor speed that is measured by the optional speed sensor 115 of FIG. 1. The speed controller 302 outputs the commanded torque or requested torque 303 as the output based on the first input and second input. If a braking request is received by the electronic data processor (264, 298), the speed controller 302 determines a commanded torque (e.g., 303) that is required to decelerate (e.g., within a target braking time period or target slowing time period, such as approximately 500 milliseconds to approximately 7 seconds), of multiple successive sampling intervals) to a zero speed or a lower speed relative to the present or last observed rotor speed. The speed controller 302 may operate in accordance with various techniques that may applied separately or cumulatively.

Under a first technique, the speed controller 302 is configured to determine the commanded torque (e.g., requested torque 303) that is proportional to a linear combination of a difference or error between the first input (e.g., commanded speed 301) and the second input (e.g., observed rotor speed, 308) and a time integral of the difference or error.

Under a second technique, the speed controller 302 is configured to determine the commanded torque (e.g., requested torque 303) that is proportional to the first input (e.g., commanded speed 301) and a time integral of the first input (e.g. where the first input or speed command is zero or less than the observed rotor speed and where the observed rotor speed is greater than the threshold rotor speed for one or more sampling intervals).

Under a third technique, the speed controller 302 is configured to determine the commanded torque to be proportional to a linear combination of: (a) an error between the first input (e.g., commanded speed 301) and the second input (e.g., observed rotor speed), and (b) the first input. For example, the proportional integral controller can use feedback control in which one signal proportional to the error (e.g., between the first input and second input) is superimposed on a ramp obtained by integrating the corrected output (e.g., commanded torque), where the integral correction increases in response to the magnitude of the error and the time during which the error persists.

Under a fourth technique, the speed controller 302 comprises a proportional integral derivative (PID) controller, instead of the proportional integral controller. A PID provides a correction based on proportional control, integral control and derivative control terms, where proportional control of an output parameter (e.g., commanded torque) is proportional to an error (e.g., an error or difference between the first input and the second input) and the derivative control adjusts or dampens the rate of change of the error correction.

Under a fifth technique, the speed controller 302 is configured to determine the commanded torque to be proportional to a linear combination of difference or error between the first input (e.g., commanded speed 301) and the second input (e.g., observed rotor speed 308), the time integral of the error, and the time-rate of change of the error.

Under a sixth technique, the speed controller 302 is configured to determine the commanded torque to be proportional to a linear combination of difference or error between the first input (e.g., commanded speed 301) and the second input (e.g., observed rotor speed 308), the time integral of the error, and the time-rate of change of the error.

Under a seventh technique, the speed controller 302 is configured to determine the commanded torque to be proportional to a linear combination of first input, the time integral of the first input, and the time-rate of change of the first input (e.g. where the first input or speed command is zero or approaches zero and where the first input is greater than threshold speed magnitude).

Under an eighth technique, speed controller 302 is configured to determine the torque command T*, which is the desired braking torque for slowing the shaft or rotor of the electric motor or electric machine (117, 277). For example, the speed controller 302 determines the commanded torque (e.g., 303) from a speed proportional integral (PI) output or system braking sequence request. If the observed torque is positive or has a positive sign, then a negative torque is synonymous with a braking torque to slow or stop the rotor of the electric machine. Conversely, if the observed torque is negative or has a negative sign, the positive torque is synonymous with a braking torque to slow or stop the rotor of the electric machine.

In one embodiment, the torque-to-current module 304 (e.g., a torque-to-current module with electric braking) has an input of the torque command (e.g., requested torque 303), an input of the direct current (DC) voltage 309 (e.g., of the DC voltage bus), and the observed rotor speed (e.g. from the sensing circuit 124 or from sensor 115).

In an alternate embodiment, the torque-to-current module 304 may comprise a torque command generation module 105 and d-q axis current generation manager (e.g., look-up tables) 109.

The torque-to-current module 304 outputs the commanded direct-axis current (Id*) 305, the commanded quadrature-axis current (Iq*) 307 via one or more equations: (a) one or more (maximum torque per ampere) MTPA equations, or (b) field weakening (FW) equation), or (c) look-up tables, inverted files, records, charts, a relational data base or other data structures. Further, the torque-to-current module 304 may enable the second mode upon detection of an observed rotor speed that exceeds the threshold speed (e.g., for one or more successive sampling intervals); the torque-to-current module 304 enables the second mode by sending an enable second mode signal or enable multi-phase-short signal (e.g., logic level signal) or an enable data message 310 (e.g., for enabling three-phase shorting) to the field-oriented control module 318.

The torque-to-current module 304 can operate in accordance with first mode, a second mode, or a third mode. In one embodiment, the third mode of operation may comprise a normal operating mode or steady-state operating mode of the electric motor or electric machine (117, 277) in which the torque to current module is configured to provide commanded direct-axis current and commanded quadrature-axis current that are: (a) consistent with an MTPA operating point or an MTPA curve of the electric motor or electric machine (117, 277) and/or (b) a target torque, a target speed of the rotor of the electric machine (117, 277), or both.

In another embodiment, the third mode (e.g., motoring mode) of operation may comprise providing commanded direct-axis current and commanded quadrature-axis current that are consistent with one or more of the following control techniques, which can be applied separately or cumulatively: (1) an MTPA operating point, an MTPA operating region, or MTPA curve of the electric motor or electric machine, or (2) a field weakening region (FW), a FW operating point, or FW curve of the electric motor or electric machine, or (3) under the volts-per-switching frequency control. In general, the MTPA curve and MTPA operating point are mutually exclusive to the FW curve or FW operating point and are not done simultaneously. For example, the torque-to-current module 304 may use the MTPA curve or MTPA operating point for lower observed speed range of the electric machine (117, 277) and the FW curve or FW operating point for a greater observed speed range of the electric motor or electric machine (117, 277), where the greater observed speed range is greater than lower observed speed range, and where the greater observed speed range and the lower observed speed range may bound or overlap each other at a transition region or at a transition boundary. The volts-per-switching frequency control (e.g., volts per Hertz, Volts/Hertz, or volts per frequency Volts/ frequency) is configured to vary one or more of the following (e.g., to maintain a commanded speed, a commanded torque, a target speed or a target torque of a rotor of the electric machine): the switching frequency, the magnitude of commanded direct-axis voltage and the magnitude commanded quadrature-axis voltage. Further, in some configurations the volts-per-frequency control maintains a constant ratio of volts/frequency to maintain a constant target torque, where the magnetic field strength of the electric machine would otherwise tend to fluctuate with frequency changes in the switching frequency of the inverter (188, 550).

In one embodiment, the torque-to-current module 304 is configured to determine and to provide a commanded direct-axis current and a commanded quadrature-axis current to an electric motor or electric machine (117, 277) in a first mode (e.g., primary braking mode) at an inefficient operating point or inefficient operating curve of a quadrature-axis current versus a direct-axis current, such that the braking (e.g., braking power) of the rotor or shaft of electric motor occurs at a rate (e.g., deceleration rate) based on (e.g., matched or aligned to, or proportional to, or less than or equal to) the available power loss (e.g., $P_{loss}$), which is greater than or equal to a available winding power loss of one or more (stator) windings (e.g., $P_{losswinding}$) of the electric motor or electric machine. Further, the torque-to-current module 304 is configured to determine a commanded direct-axis current and a commanded quadrature-axis current for a first mode based on one or more of the following: (a) a braking commanded torque or zero commanded torque that opposes the rotating of the rotor of the electric motor or electric machine for one or more sampling intervals, or (b) a braking commanded speed or zero commanded speed that opposes the rotating of the rotor of electric motor or electric machine for one or more sampling intervals, or (c) both. In some embodiments, the electric motor is operated in the first mode (e.g., preliminary braking mode) until the observed rotor speed of the electric motor or electric machine (117, 277) is less than or equal to a threshold speed magnitude (e.g., three-phase-short threshold speed).

In one embodiment, the torque-to-current module 304 is configured to operate in a second mode (e.g., secondary braking mode or final braking mode), which is a multi-phase shorting, such as a three-phase-short mode or a three-phase-short braking mode. The torque-to-current module 304 is configured to determine a commanded direct-axis current and a commanded quadrature-axis current for a second mode based on one or more of the following: (a) a braking commanded torque or zero commanded torque that opposes the rotating of the rotor of the electric motor or electric machine (117, 277) for one or more sampling intervals, or (b) a braking commanded speed or zero commanded speed that opposes rotating of the electric motor or electric machine (117, 277) for one or more sampling intervals, or (c) both. In some embodiments, the electric motor or electric machine (117, 277) is operated in the second mode after or once the observed rotor speed of the electric machine (117, 277) is less than the threshold rotor speed (e.g., three-phase-short threshold speed).

In the second mode (e.g., secondary braking mode), the torque-to-current module 304 sends the three-phase short enable signal or data message to the field-oriented control module 318. In turn, the field-oriented control module 318 is configured to operate in a second mode with a negative torque command, zero torque command, or one or more zero-approaching torque commands (e.g. within a series of decreasing or decremented torque commands over successive time intervals, where such torque commands approach zero) if the observed rotor speed is less than or equal to the threshold speed, by applying three-phase shorting via the winding terminals of the electric motor or electric machine (117, 277) to brake, slow, or bring the rotor or shaft of the electric motor or electric machine (117, 277) to a target speed or velocity, such as zero target speed or a stop. The torque-to-current controller (675, 676) is configured to generate an enable three-phase-short signal or data message responsive to the observed rotor speed being less than or equal to the threshold speed. The enable three-phase-short signal or data message is communicated to the field-oriented control module 318, which can adjust the driver signals to the inverter or inverter switching circuit that controls the electric motor (117, 277) (e.g., adjust the duty cycle). For example, the field-oriented control module 318 may determine the timing, duration and logic level(s) of pulses applied to the control terminals (320, 322, 324 in FIG. 3) of an inverter 550 or an inverter switching circuit (188, 275). The field-oriented control module 318 can provide control signals, including but not limited to, duty-cycle control signals, to each gate of respective field effect transistor switch or each base of a respective transistor) for each phase to control the switching states of the low-side switches 283 and high-side switches 282 of each phase of the inverter 275 or inverter switching circuit 188. The duty cycle A refers to the duty cycle applied to the first phase of the inverter; the duty cycle B refers to the duty cycle applied to second phase of the inverter; the duty cycle C refers to the duty cycle applied to the third phase of the inverter, where the duty cycle ratio of each switch of any inverter phase is generally set to a default of approximately fifty percent, less any allowance for dead-time.

In the first mode (e.g., preliminary braking mode), as explained later in conjunction with FIG. 6, the commanded direct-axis current and the commanded quadrature-axis current can be determined by inefficient operating point or inefficient operating curves of the quadrature-axis current 600 (e.g., on vertical axis) with respect to the direct-axis current 602 (e.g., on a horizontal axis), where the inefficient operating curve is derated from the MTPA operating curve and/or the FW operating curve of the third mode (e.g., normal or steady state operation). For example, during the third mode the relationship between the direct-axis current and the quadrature-axis current is bounded by an outer voltage limiting curve (e.g., ellipse) at the base speed and an inner voltage limiting curve (e.g., ellipse) at the maximum speed. Further, for instance, the torque-to-current converter is configured to determine the commanded direct-axis current and the commanded quadrature-axis current in accordance with a variable speed current locus of maximum torque for permanent magnet electric motor or electric machine that lies on the armature current limit arc or current limit arc for the electric machine (117, 277). Ordinarily, the maximum torque is associated with the intersection of the armature current limit and the voltage limiting curve (e.g., ellipse), which can be used to set one or more braking torques to rapidly bring the rotor or shaft to a stop during a braking time or slowing time.

In one embodiment, if the speed controller 302 detects a commanded negative speed or a commanded zero speed and if the torque-to-current module 304 (e.g., controller (675, 676)) detects a commanded negative torque or a commanded zero torque, the torque-to-current controller (675, 676) is configured to transition from the third mode (e.g., motoring mode, generating mode, or steady-state normal operational motoring mode) to the first mode (e.g., preliminary braking mode or matched power loss braking mode). For the first mode a maximum torque (e.g., maximum breaking torque) may be available at an intermediate rotor speed range: (a) that is a fraction or percentage (e.g., approximately 50 percent or less) of a maximum rotor speed, (b) that is above the speed threshold, and (c) where for a permanent magnet brushless electric machine (117, 277) (e.g., as opposed to an induction machine), the maximum torque tends to increase as it approaches the rotor speed threshold (e.g., and yet is still greater than the speed threshold in which the second mode is applied).

In the first mode (e.g., preliminary braking mode), the torque-to-current module 304 determines the commanded quadrature-axis current, Iq, which is the closed loop regulation target to achieve the commanded torque (e.g., requested torque 303). The torque-to-current module 304 determines the commanded direct-axis current, I, which is a closed loop target derived with the MTPA equation, FW equation, or one or more look-up tables, such that the power losses (e.g., available $P_{loss}$) of the electric motor or electric machine reduce, attenuate or exceed the generated electrical power at the DC terminal bus so that one or more of the following are not damaged: (a) DC bus capacitor, (b) ultra-capacitor on DC bus, (c) combination of alternator and rectifier coupled to DC bus, (d) the generator coupled to the direct current (DC) bus and/or (e) battery coupled to the DC bus. For example, the commanded torque to respective commanded Id/Iq operating points (each respective pair of Id* and Iq*) are stored in one or more lookup tables or other data storage in a data storage device (260, 299). When commanded to stop, brake, or slow the rotor or shaft of the electric motor or electric machine (117, 277), which may be mechanically coupled or connected (e.g., via fasteners, via a mechanical slip clutch, or via a slip bushing) to a rotating tool, rotating blade, or rotating cutter or rotary saw, the speed controller 302 and/or torque-to-current controller 304 will request braking torque according to the speed controller 302 (e.g., speed PI or PID) desired response.

The current regulator 316 generally converts the commanded direct-axis current 305 and the commanded quadrature-axis current 307 (e.g., provided by the torque-to-current module 304) into commanded direct-axis voltage 312 (Vd*) and commanded quadrature-axis voltage 314 (Vq*), respectively, which are inputted into the field-oriented control module 318, which comprises a driver stage (e.g., pulse width modulation module) for the inverter (188, 550).

In one embodiment, the torque-to-current module 304, alone or together with the field-oriented control module 318, is configured to receive required torque or commanded torque (T or T*) to generate the required values of direct-axis current ($I_d$ or $I_{d*}$) and quadrature axis current ($I_q$ or $I_{q*}$) based on a direct-axis magnetic flux or the adjusted, direct-axis magnetic flux or estimated back EMF constant, $\lambda_f$, the direct axis inductance ($L_d$), the quadrature axis inductance ($L_q$), and the number of machine poles (p) or pole pairs ($P_p$) that are determined by characterization of the electric motor or electric machine. For example, the following equations, or equivalent look-up tables, can be used for field oriented control of a permanent magnet electric machine for the efficient operating mode or third mode:

$$T = p\frac{3}{2}(\lambda_f + (L_d - L_q)I_d)I_q;$$

$$\lambda_d = L_d I_d + \lambda_f$$

where, T or T* is the required torque or commanded torque;

$I_d$ or $I_{d*}$ is the direct-axis current;

$I_q$ or $I_{q*}$ is the quadrature axis current;

$\lambda_f$ is adjusted magnetic flux, or estimated back EMF constant, which can be derived from direct-axis magnetic flux;

$L_d$ is the direct axis inductance;

$L_q$ is the quadrature axis inductance, and p is the number of machine poles (p) or the equivalent number of machine pole pairs ($P_p$), or vice versa as the context requires.

For operating in the first mode (e.g., preliminary braking mode), the operating point from the above equation or MTPA equation (relative to the third mode) can be estimated as an inefficient operating point or an inefficient operating curve by a power loss model, such as a power loss model or power loss equation (e.g., $P_{loss}$) based a difference between the input power and the output power of the electric machine, where the braking power is aligned to, matched to, or proportional to the total available power loss (e.g., $P_{loss}$) in which the available power loss of the winding component may represent a minimum or floor for the total available power loss.

The input power can be expressed as the sum of the input powers for each phase, where the input power for each phase is expressed as the input voltage multiplied by the input current to the electric machine input terminals (e.g., for each of one or more phases). The mechanical output power is estimated by the torque multiplied by the (mechanical) speed of the rotor. $P_{loss}$ is the power loss or power derating for the first mode (e.g., preliminary braking mode) and zero power braking, which includes, but is not limited to, the power loss in each energized motor winding estimated as $I^2R$ loss, where I is the current in the respective winding and R is the resistance or rotor and/or of the respective winding, among other losses, such as electromagnetic losses and switching frequency-dependent inductance losses.

$$P_{losswinding} = (I_a V_a + I_b V_b + I_c V_c) - T\Omega,$$

where:

$P_{losswinding}$ is the power loss or power derating for the first mode (e.g., preliminary braking mode) and zero power braking; $I_a$ is the current at the first phase terminal of the electric machine (e.g., expressed in root mean square (RMS) volts;

$I_b$ is the current at the second phase terminal of the electric machine (e.g., expressed in root mean square (RMS) volts;

$I_c$ is the current at the third phase terminal of the electric machine (e.g., expressed in root mean square (RMS) volts;

$V_a$ is the voltage at a first phase terminal of the electric machine (e.g., expressed in root mean square (RMS) volts);

$V_b$ is the voltage at a second phase terminal of the electric machine;

$V_c$ is the voltage at a third phase terminal of the electric machine; T is the torque and $\Omega$ is the (mechanical) speed of the rotor.

$E_m = (P_{in} - P_{loss})/P_{in}$, where $E_m$ is the efficiency of the electric motor or electric machine (117, 277) in a motoring mode, an electrical power generating mode, or in a braking mode and where $E_m$ can have a range from 0 to 1; Pin is the sum of electric input energy to motor input terminals for an observation time period; $P_{loss}$ is the total power loss of the electric motor or electric machine (117, 277), where $P_{losswinding}$ is a constituent component of the total power loss ($P_{loss}$) and $P_{losswinding}$ represents an available power loss of one or more windings of the electric machine for the first mode and zero power braking. Efficiency, $E_m$, can be expressed as a percentage by multiplying $E_m$ by 100.

For a simple case where the direct-axis inductance and the quadrature axis inductance are approximately equal (e.g., $L_d = L_q$), the synchronous permanent magnet electric machine (e.g., motor) has the following equation:

$$T = 1.5 P_p \lambda_f I_q;$$

where T is torque;

$P_p$ is a pole pair;

$\lambda_f$ is a magnetic flux;

$I_q$ is the quadrature-axis current.

Assuming motor losses are $3 \times I_{rms}^2 \times R_{motor}$, then set the generated mechanical power equal to the motor losses to get:

$$T\Omega = \frac{3\sqrt{I_d^2 + I_q^2}^2}{\sqrt{2}^2 R_{motor}}$$

where T is the torque, $\Omega$ is the rotor speed;

$R_{motor}$ is the resistance of the electric motor or electric machine; which can be expressed as:

$$Id = -\sqrt{\left(\frac{2}{3} T\Omega R_{motor}\right)^2 - I_q^2}$$

The above equation for $I_d$ as a function of $I_q$ to ensure the given operating point has losses equal to the mechanical power; hence, provides no DC current to damage the alternator.

The torque-to-current module 304 determines equation-based control of the electric machine (117, 277), such as equation-based controller (e.g., equation-based interior permanent magnet controller (675, 676)) that applies one or more of the following: (a) maximum torque per amp (MTPA) equations, and/or (b) field weakening (FW) equations; (c) or both.

In one configuration, the torque-to-current module 304 (e.g., a torque-to-current controller or electric-machine controller (675, 676)) determines a commanded quadrature-axis current (Iq*) based on the inputted second torque error signal. The commanded quadrature-axis current (Iq*) is applied to a field-oriented control module 318. In one embodiment, the field-oriented control module 318 determines or estimates a commanded current, such as commanded direct-axis current (Id*) for the corresponding commanded quadrature-axis current (Iq*) based on an estimated direct-axis inductance (Ld) and an estimated quadrature-axis inductance (Lq) of a respective electric machine. Throughout this document, commanded current means the matched pair or combination of commanded direct-axis current and commanded quadrature-axis current.

For example, the field-oriented control module 318, alone or together with the torque-to-current module 304 may estimate the estimated direct-axis inductance (Ld) and an estimated quadrature-axis inductance (Lq) of a respective electric machine to be consistent with one or more of the following: (a) maximum torque per amp (MTPA) equations, and/or (b) field weakening (FW) equations. Accordingly, the inductance estimation module is configured to provide the estimated inductances as inputs to the field-oriented control module 318. Meanwhile, the torque to control module, alone or together with the field-oriented control module 318 is capable of communicating estimated torque based on the commanded current (Id*, Iq*) to the current regulator 316.

The current regulator 316 determines a commanded direct-axis voltage (Vd*) and a commanded quadrature-axis voltage (Vq*) that is provided to one or more of the following: (1) pulse-width modulation module or driver for the inverter, (2) inductance estimation module, inductance estimator, or field oriented control module and (3) a speed controller 302 or torque estimation module, or torque estimator. The current regulator 316 is capable of communication with, or coupled to, the pulse-width modulation module, such as a space-vector pulse-width modulation module, or driver for an inverter.

In one embodiment, the pulse-width modulation module drives a switching circuit 275, such as power electronics switches (e.g., power field effect transistors or insulated gate bipolar junction transistors), with control signals 265. As illustrated in FIG. 5A and/or FIG. 5B, a first control signal (da) is associated with the first control terminals 293 of the first phase 279 of the switches (282, 283); the second control signal (db) is associated with the second control terminals 294 of the second phase 280 of the switches (282, 283); the third control signal (dc) is associated with the third control terminals 295 of the third phase 281 of the switches (282, 283). For each phase (279, 280, 281), the switched terminal of a low-side switch 283 is coupled to a corresponding switched terminal of a high-side switch 282 at alternating current nodes (290, 291, 292).

In turn, the switching circuit 275 is coupled to an electric machine 277, such as a, interior permanent magnet, synchronous electric machine, or an alternating current electric motor or alternator. The electric machine 277 may have one or more phases (at phase terminals or alternating current terminals 276) that receive alternating current (e.g., sinusoidal control signals) with different phase offsets to each other. Further, the electric machine 277 may be associated with a resolver, an encoder or another sensor for sensing an angular position, speed, velocity or acceleration of the rotor shaft.

In FIG. 5A and FIG. 5B, each high-side and low-side switch has a protection diode 284 (e.g., free-wheeling diode) coupled to its switched terminals. The protection diode 284 may allow current to flow through the protection diode 284 after a respective switch is turned off, for example. FIG. 5A and FIG. 5B, each illustrate a driver stage, such as field-oriented control module, that comprises an electronic data processor 298, data storage device 299, and data ports 296 coupled to a data bus 297 to support communication between one or more of the foregoing devices, such as the electronic data processor 298, data storage device 299, and data ports 296. Here, the control terminals (293, 294, 295) of the switches (282, 283) are coupled to the data ports 296; the data storage device 299 can store executable code or software instructions 278, alone or together with libraries and data, where the executable code, software instructions, libraries and data are executable by the electronic data processor 298.

Determining Commanded Quadrature-Axis Current (Iq*) for a Corresponding Torque Command The data processor (264 or 298) or sensing circuit 124 estimates a rotor speed of the electric machine 277 by a sensor-less (not a senseless) rotor speed detection mechanism, such as estimating the rotor speed by current sensors or voltage sensors on one or more alternating current phases (e.g., stator windings to which one or more substantially sinusoidal signals or quasi-sinusoidal signals that resemble or approximate true sinusoidal signals are applied) by the inverter (550, 188) to the electric machine (277, 117). However, in an alternate embodiment, an optional sensor (e.g., rotor speed sensor in FIG. 21) may comprise an encoder, a resolver, or a magnetic field sensor associated with an embedded magnet or magnetized portion of the rotor to provide an estimated or observed rotor speed.

If the observed rotor speed is less than or equal to a first rotor speed threshold, then the electronic data processor (264, 298) (298, 264) or controller (675, 676) of the inverter (550, 188) may operate in the MTPA region of the direct-quadrature current plane (e.g., defined by a combination of an inverter 550 and electric machine 277) or in corresponding MTPA mode. The maximum quadrature axis current tends to be associated with a corresponding maximum operational torque or maximum operational torque region of the electric machine (277, 117). For the MTPA mode, the maximum quadrature-axis current Iq is defined as the point where the MTPA curve intersects the current limit arc. Further, in the MTPA mode the electronic data processor (264, 298) (298, 264) or controller (675, 676) of the inverter (550, 188) uses a first equation for estimation of peak Iq or maximum quadrature-axis current, Iq (e.g., $I_{q\_max}^{MTPA}$) based on MTPA region as follows:

$$I_{q\_max}^{MTPA} = \sqrt{I_{s\_max}^2 - \left(\frac{\lambda_f - \sqrt{\lambda_f^2 + 8(L_q - L_d)I_{s\_max}^2}}{4(L_q - L_d)}\right)}$$

where:

$I_{s\_max}$ is the maximum quadrature-axis current of the stator windings of the electric machine 277 within the MTPA region or on the MTPA curve.

In practice, the maximum quadrature-axis current of the stator windings may be aligned with or limited by the current ratings of the semiconductor switches (282, 283) in the inverter switching circuit 275 of the inverter 550. For example, the first equation to determine maximum quadrature-axis current, Iq, (e.g., $I_{q\_max}^{MTPA}$) may represent the operating region (or peak $I_q$) where the MTPA curve intersects a current limit arc (e.g., circumscribing an arc about an origin of the $I_q$ and $I_d$ axes.)

However, if the observed rotor speed is greater than a first rotor speed threshold or base speed of the electric machine (277, 117), then the electronic data processor (264, 298) (264, 298) or controller (675, 676) of the inverter (188, 550) may operate in the field-weakening region or the corresponding field weakening mode. In one embodiment, the filed weakening mode is generally mutually exclusive to the MTPA mode. Further, in the field weakening mode the electronic data processor (264, 298) (264, 298) or controller (675, 676) uses a second equation for estimation of peak Iq or maximum, $I_{q\_max}^{MTPA}$, based on field weakening as follows:

$$I_{q\_max}^{FW} = \frac{(V_{dc}/\sqrt{3})f_{util}}{w_e L_q},$$

where $f_{util}$ is the utilization factor with a range between 0 and 1.

In one embodiment, the utilization factor measures the output power of the inverter 550 divided by the sum of power switched by or within each of the output semiconductor switches in the inverter, based on a corresponding duty cycle or fixed duty cycle. Therefore, limiting the utilization factor can protect the inverter 550 from thermal damage. In another embodiment, the utilization factor comprises a voltage utilization factor expressed as percentage of the dc bus voltage (e.g., 95 percent of the DC bus voltage).

Once an estimated rotor speed of the electric machine 277 is above the first rotor speed threshold or base speed of the machine, the current commands no longer track along the MTPA curve, but follow the voltage ellipse instead of the FW mode. For example, in the field weakening mode the Iq maximum limit is not based on Iqmax for the MTPA mode, but rather based on the Iq maximum calculated within the FW region bounded by the current limit arc and the voltage ellipse; hence, the corresponding equations for the voltage ellipse apply in the FW mode. For example, in FW region, the maximum torque may be associated with the voltage ellipse curve, and can possibly align with one or more torque speed curves.

Determining Corresponding Lowest Current Magnitude of Commanded Direct-Axis Current (Id*) to Reach Target Commanded torque The data processor (264, 298) or inverter (188, 550) can apply the commanded quadrature-axis current $I_q$ of the torque-to-current module 304 into the equations of the equation-based controller (675, 676) or field-oriented control module 318 to calculate the corresponding commanded direct-axis current ($I_d$ command) or a matched pair of the commanded q-axis current and commanded d-axis current. In one embodiment, for the MTPA region, the data processor (264, 298) of the inverter (188, 550) determines the current commands (e.g., commanded Id current) such that the commanded torque or the estimated, measured torque is reached with the smallest current magnitude possible for an efficient MTPA operating point or efficient MTPA operating curve of the third mode. In one embodiment, the equation-based controller (675, 676) or field-oriented control module 318 in the MTPA mode is configured to determine the corresponding commanded indirect-axis current (Id*) following the MTPA curve by applying the following equation:

$$i_d^{MTPA} * = \frac{\lambda_f - \sqrt{\lambda_f^2 - 4(L_q - L_d)^2 i_q^2}}{2(L_q - L_d)}$$

The above commanded indirect-axis current ($I_d$*) is a function of the estimated back EMF constant, $\lambda_f$; inductances $L_q$, $L_d$; and commanded quadrature-axis current ($I_q$ or $I_{q*}$).

Determining Adjustments for Field Weakening (FW) Region Mode

For the field weakening region, which is above the minimum threshold rotor speed (e.g., base speed) of the electric machine (117, 277), the voltage of the DC bus 350 may be limited, or rather place attendant limits on the extent of size of the FW voltage ellipse. Although the DC bus 350 is illustrated with a negative DC voltage terminal or rail, and a positive DC voltage terminal or rail, it is understood that the negative DC voltage terminal may be connected to earth ground, chassis ground or another ground connection in FIG. 5A and/or FIG. 5B to support three-phase shorting. The commanded direct-axis current, $i_q^{FW}*$ for the field weakening mode, is a function of the voltage of the DC bus 350, electric rotor speed of electric machine 277, estimated inductances 2, back-EMF constant $\lambda_f$, and the commanded quadrature-axis current, $I_q*$. The value of utilization factor, $f_{util}$, is selected to protect the inverter 550, where the value may range from 0 to 1. For example, the utilization factor can be set to (use) ninety-five percent (e.g., 95%) of the available voltage of DC bus 350 or its associated power, which may limit, scale or reduce the size of the FW voltage ellipse. In the field weakening mode, the inverter or data processor (264, 298) operates above the minimum threshold speed of the electric machine 277, the commanded current (e.g., commanded direct-axis current) no longer tracks along the MTPA curve, but follows the voltage ellipse instead. The following equation gives the $i_d^{FW}$ as a function of the $i_{q*}$ command:

$$i_d^{FW} * = -\frac{\lambda_f}{L_d} + \frac{1}{L_d}\sqrt{\left(\frac{\frac{V_{dc}}{\sqrt{3}} f_{util}}{\omega_e}\right)^2 - L_q^2 i_{q*}^2}$$

Inverter and Three Phase Short, Second Mode

As illustrated in FIG. 5A and/or FIG. 5B, an inverter comprises a high-side switch 282 and a corresponding low-side switch 283. Each high-side switch 282 and a corresponding low-side switch 283 has a control terminal (293, 294, 295) and switched terminals. A first one of the switched terminals of each high-side switch 282 is coupled to a direct current bus terminal 350 and a second one of the switched terminal of each high-side switch 282 is coupled to a first one of the switched terminals of the corresponding low-side switch 283 at a respective alternating current output terminal 290. A second one of the switched terminals of the corresponding low-side switch 283 is coupled to another direct current bus terminal 350. Although the DC bus 350 is illustrated with a negative DC voltage terminal or rail, and a positive DC voltage terminal or rail, it is understood that the negative DC voltage terminal may be connected to earth ground, chassis ground or another ground connection (e.g., via a standard electrical ground connection symbol) in FIG. 5A and/or FIG. 5B to support three-phase shorting to route the electrical energy to ground via the low side switches, which are typically pulsed or triggered to limit the peak current transients and peak voltage transients in the windings and/or on the DC bus 350.

An energy storage device, such as a capacitor, an ultra-capacitor, or a battery, is coupled to the direct current bus terminals 350. For example, a direct current bus capacitor is coupled in parallel across the direct current bus terminals, wherein the direct current bus capacitor.

In response to the detection of the threshold speed, a controller (675, 676) is configured to provide control signals to switch or toggle the corresponding low-side switch 283 or switches 283 to manage: (a) the charging and discharging of the direct current bus capacitor and/or (b) the direct current (DC) bus voltage between a minimum DC voltage and a maximum DC voltage that define a range suitable for providing energy to avoid damage to the energy storage device, such as the DC bus capacitor, ultracapacitor, alone or together with a battery.

If one or more of the low-side switches 283 are turned on simultaneously, or sequentially, the windings (e.g., stator windings) of the electric machine are shorted or connected to ground (or to the negative terminal of the DC bus) can produce a transient voltage rise or spike on the DC bus or DC link 350, where the transient or spike can be controlled by suitable switching control signals (e.g., pulse duration or duty cycle and frequency). For example, a transient voltage spike or rise can make the energy storage device (e.g., capacitor, ultracapacitor or battery) connected in parallel to the DC bus 350 (e.g., between the DC bus terminals) susceptible to over-charging or damage from peak voltage transients during the first mode (e.g., preliminary braking mode) that might otherwise occur. By applying the second mode (e.g., secondary braking mode), alone or together with the first mode (e.g., primary braking mode) the transient voltage rise or spike on the DC bus 350 can be reduced or eliminated to maintain the DC capacitor voltage of capacitor (connected between the DC bus 350 terminals) within the target range that supports the braking mode (e.g., regenerative braking or thermal dissipation braking mode, or both). In one configuration, if each of the low-side switches 283 are turned on simultaneously, or sequentially, ones of the corresponding windings (e.g., stator windings) of the electric machine 277 are shorted or connected to ground to avoid over-charging of the energy storage device(s) on DC bus 350 during the braking mode to maintain the DC capacitor voltage of capacitor within the target range (e.g., that supports the regenerative braking mode). For example, when or more low side switches 283 (e.g., all of the low-side switches) are turned on, the motor back-EMF is discharged to ground instead of into the capacitor.

Figure 4:
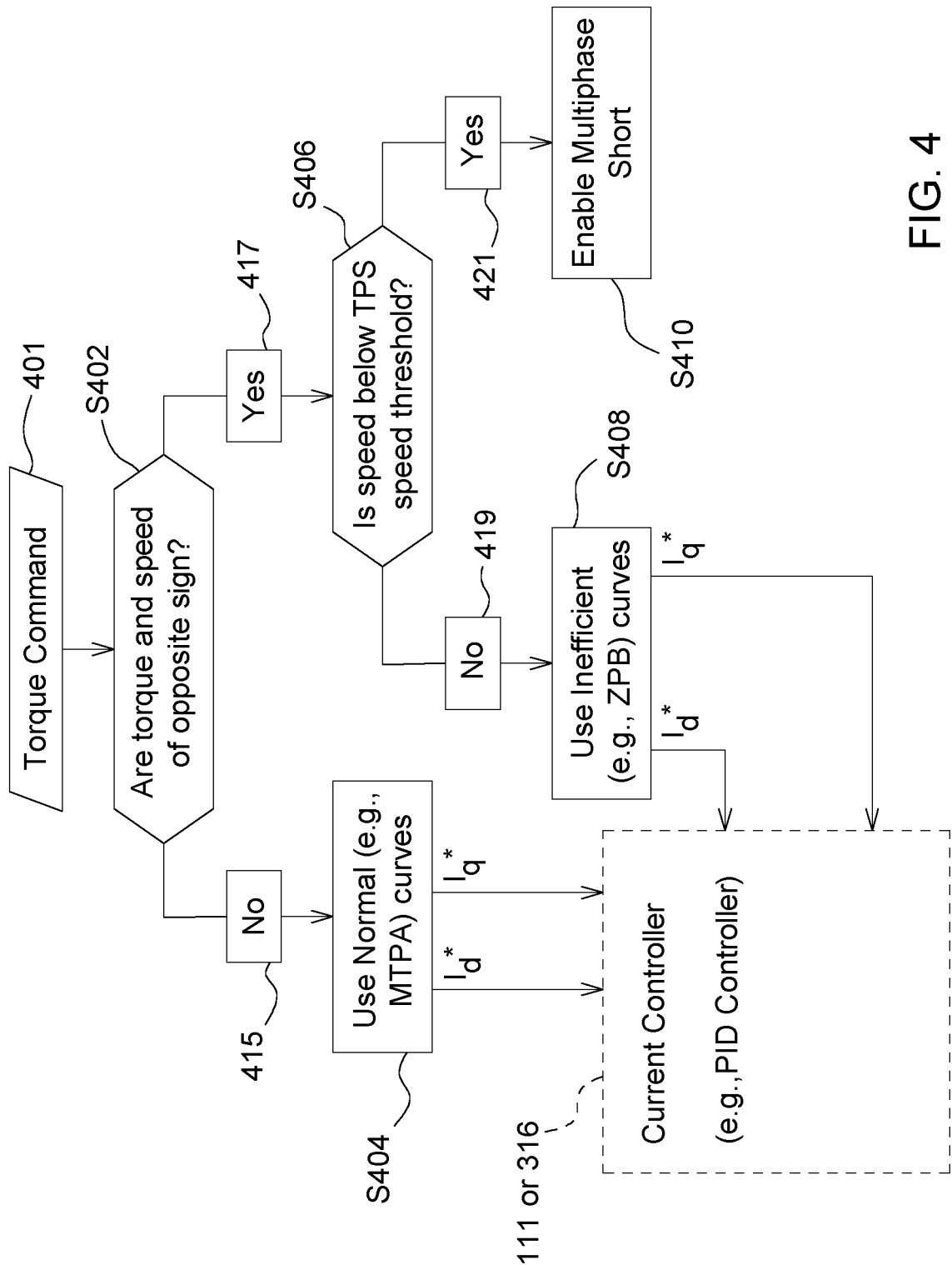
FIG. 4 is a flow chart of a second embodiment of a method for controlling braking of an electrical motor.

FIG. 4 discloses a first embodiment of a method for controlling braking of an electric motor. The method of FIG. 4 begins in step 401.

A speed controller 302 (e.g., within the electric-machine controller 675, 676) or an electronic data processor (264, 298) is configured to provide commanded torque or torque command 401 (e.g., in a torque control mode). A commanded torque can be configured to maintain or change (e.g., increase or decrease) the observed torque or observed speed of the rotor of an electric machine. For example, a commanded torque can: (a) reduce the observed torque of the rotor of the electric machine, (b) decrease the observed torque of the rotor of the electric machine, and/or (c) brake or stop the rotor of the electric machine, where the commanded torque (e.g., braking commanded torque) has a negative sign that opposes an observed positive torque or observed torque with a positive sign. The electric machine be associated with speed sensor, a torque sensor or both, where the observed speed and observed torque may be estimated based on measurements, by the speed sensor, the torque sensor or both, of the voltage and current at alternating current terminals of the electric machine. The speed sensor, the torque sensor or both may be implemented by a voltage sensor, a current sensor, a scaling circuit, a voltage divider, a digital-to-analog converter, and other electronic devices, an electronic data processor or other electronic data processing systems that execute software instructions or software modules stored in a data storage device.

In step S402, a torque-to-current module 304 or the electronic data processor (264, 298) is configured to determine whether the torque (e.g., observed torque or commanded torque) and speed (e.g., observed speed or commanded speed) have opposite signs (e.g., positive and negative signs). In other words, the product of the torque (e.g., commanded torque or observed torque) multiplied by the speed has a resultant negative sign. If the torque and speed have opposite signs or if the product of the torque and the speed are negative, the method continues with step S406, which may be indicated by yes in block 417. For example, an observed positive torque may be reduced or opposed by a commanded negative torque to brake or reduce the observed speed (e.g., rotational speed of the rotor) of positive sign.

However, if the torque and speed do not have opposite signs, or if product of the torque and the speed are positive (e.g., not negative), then the method continues with step S404, which may be indicated by no in block 415. For example, an observed positive torque may maintain or increase the (positive) observed speed (e.g., rotational speed of the rotor) of positive sign; conversely, an observed negative torque may maintain or increase the (negative) observed speed of negative sign of the rotor of the electric machine.

In step S404, the torque-to-current module 304, the field-oriented control module 318, and/or the electronic data processor (264, 298) are configured to operate in the third mode (e.g., normal mode), with one or more of the following: (a) normal MTPA curves or a normal MTPA operational region, (b) a normal-field weakening curve or operational region, (c) normal field oriented control operating regions, or other normal operational curves. Step S404 may be executed in accordance with various examples, which may be applied separately or cumulatively. Under a first example, the torque-to-current module 304 or the electronic data processor (264, 298) are configured to determine commanded direct-axis current and commanded quadrature axis current based on the commanded torque and speed (e.g., observed speed or commanded speed).

Under a second example, the torque-to-current module 304 or the electronic data processor (264, 298) are configured to determine commanded direct-axis current and commanded quadrature axis current based on observed torque and observed speed.

Under a third example, the torque-to-current module 304 (e.g., of an electric machine controller 675, 676) or the electronic data processor (264, 298) are configured to determine commanded direct-axis current and commanded quadrature axis current based on observed torque, or observed speed, or both, where an electronic controller (e.g., 675, 676) controls (e.g., the modulation or pulse width modulation of) the commanded current or commanded voltage to an inverter switching circuit in accordance with a proportional integral control algorithm or a proportional integral derivative control algorithm. In a proportional integral control algorithm or in a proportional integral controller, the output is proportional to a linear combination of the input and a time integral of the input. In a proportional integral derivative control algorithm or in a proportional integral derivative controller the output is proportional to a linear combination of the time integral of the input and the time rate of change of the input.

In a fourth example, for field-oriented control or vector control, the torque-to-current module 304, the field-oriented control module 318, and/or the electronic data processor (264, 298) is configured to provide a stator current that is aligned with the q-axis current and a pole electromagnetic flux that is aligned to the d-axis current, alone or together with temperature compensation (e.g., by a look-up table) for temporary magnetic force reduction of permanent magnet responsive to increased temperate of the rotor and compensation for variation or decrease in inductances (e.g., d-axis inductance (Ld) and q-axis inductance (Lq) with increased stator current magnitude.

In a fifth example, for field weaking control the torque-to-current module 304, the field-oriented control module 318, and/or the electronic data processor (264, 298) is configured to provide an increased commanded direct-axis current, an increased commanded quadrature-axis current, or both, at a speed of the rotor above a speed threshold to compensate for field weakening (e.g., where the switching frequency or fundamental switching frequency is fixed or constant or limited to a range.)

In a sixth example, for field weaking control the torque-to-current module 304, the field-oriented control module 318, and/or the electronic data processor (264, 298) is configured to provide an increased commanded direct-axis voltage, an increased commanded quadrature-axis voltage, or both, at a speed of the rotor above a speed threshold to compensate for field weakening (e.g., where the switching frequency or fundamental switching frequency is fixed or constant or limited to a range.)

In step S406, the speed controller 302 (e.g., of the electric-machine controller 675, 676) or data processor (264, 298) determines whether the observed rotor speed of the electric motor or electric machine is less than the rotor speed threshold magnitude (e.g., three-phase short speed threshold magnitude). If the observed rotor speed of the electric motor or electric machine is less than the rotor speed threshold magnitude, the method continues in step S410, as indicated by the yes in block 421. However, if the observed rotor speed of the electric motor or electric machine is not less than (e.g., is equal to or greater than) the rotor speed threshold magnitude, then the method continues with step S408 as indicated by the no in block 419.

In step S408, the torque-to-current module 304, the field-oriented control module 318 and/or the electronic data processor (264, 298) are configured to operate in the first mode (e.g., preliminary braking mode or matched-loss-to-braking-power mode), with inefficient, which can be referred to as zero power braking curves (ZPB) in which mechanical rotational energy of the rotor of the electric machine (e.g., electric motor) is opposed by conversion of the mechanical rotational energy into matched or aligned total available losses, such as electrical, electromagnetic, mechanical and thermal energy, in accordance with inefficient operating points, inefficient operating curves or inefficient operating regions.

In one embodiment, the inefficient operating points, inefficient operating curves or inefficient operating regions for control (e.g., field-oriented-control) of the electric machine are matched-loss-to-braking power that can be expressed in terms of any of the following: (a) the commanded direct-axis current, commanded quadrature axis current, observed direct axis current, observed quadrature axis current, as illustrated in FIG. 6, and/or (b) observed rotor speed and observed rotor torque (e.g., associated with a torque versus speed graph for the electric machine) corresponding to the commanded direct-axis current, commanded quadrature axis current (e.g., in FIG. 6). In one configuration, a zero power braking curve may be realized as matched, aligned, or limited mechanical braking power to available power losses or total available power losses. The first mode can be described as a mode (e.g., preliminary braking mode or matched-loss-to-braking power mode) in which mechanical braking power (that opposes the rotational energy of the rotor of the electric machine or electric motor) is matched, aligned, proportional to, less than or equal to, or limited to available power losses, which include a thermal dissipation loss component.

In one illustrative embodiment, if the total available power loss ($P_{loss}$) were limited to or set equal to the available power loss of stator windings ($P_{losswinding}$) of the electric machine (e.g., as a special case that sets the floor or lower limit for a minimum $P_{loss}$), the available power loss component for the respective (stator) windings (e.g., 671, 672, 673) can be described in accordance with the following equation for a three-phase electric machine: $P_{loss} = I_A^2 R_A + I_B^2 R_B + I_C^2 R_C$, where $P_{loss}$ equals $P_{losswinding}$ as the available power loss in the windings, where $I_A$ is the first phase or phase A current (e.g., root mean squared current for phase A), where $I_B$ is the second phase or phase B current (e.g., root mean squared current for phase B), where $I_C$ is the third phase or phase C current (e.g., root mean squared current for phase C), where $R_A$ is the first phase or phase A resistance, where $R_B$ is the is the second phase or phase B resistance and, where $R_C$ is the third phase or phase C resistance.

In alternate embodiments and in practice, the total available power $P_{loss}$ loss may contain contributions from other electrical, electromagnetic, mechanical and thermal losses loss components) of one or more of the following: (a) the electric machine or electric motor, (b) one or more stator windings of the electric machine or electric motor (e.g., referred to as $P_{losswinding}$), (c) the conductors or cabling that couple the inverter to the electric machine or electric motor, (d) the capacitor, batteries or energy storage devices coupled to the DC bus or DC link (of the inverter), and/or (e) any inductors, filters or other components coupled to the AC terminals (e.g., phase terminals) of the electric machine or electric motor. Accordingly, in the alternate embodiments, the total available power $P_{loss}$ loss may exceed $P_{losswinding}$ based on additional contributions of other power losses within the vehicle power train electronics and electrical system.

In step S408, the torque-to-current module 304, the field-oriented control module 318 and/or the electronic data processor (264, 298) are configured to operate in accordance with various techniques, which may be applied separately or cumulatively.

Under a first technique, the torque-to-current module 304, the field-oriented control module 318 and/or the electronic data processor (264, 298) are configured to operate in the first mode (e.g., preliminary braking mode) by outputting commanded direct axis current and commanded quadrature axis current based on the zero power braking curves. For example, in the first mode of step S408 the torque-to-current module 304, the field-oriented control module 318 and/or the electronic data processor (264, 298) are configured to match or align a braking power of the electric machine (117, 277) or electric motor to (e.g., be proportional to, or equal to or less than) the total available power loss for the electric machine (117, 277) that comprises an available power loss component of one or more windings of the electric machine (117, 277).

Under a second technique in step S408, the torque-to-current module 304, the field-oriented control module 318 and/or the electronic data processor (264, 298) are configured to operate in the first mode (e.g., primary braking mode) by outputting commanded direct-axis current and commanded quadrature-axis current based on the zero power braking curves, such as inefficient MTPA curves or inefficient MTPA operating points, inefficient field weakening curve or operational region, inefficient field oriented control operating regions, or other normal operational curves.

Under a third technique in step S408, the torque-to-current module 304, the field-oriented control module 318 and/or the electronic data processor (264, 298) are configured to operate in the first mode (e.g., primary braking mode) by determining a commanded quadrature axis current to oppose or reduce the observed torque and to oppose or reduce observed speed consistent with the total available power loss or zero power braking curve. Further, the commanded quadrature axis may be determined for each successive sampling interval based on the then-current observed torque, the then-current observed speed, or both. Next, for one or more successive sampling intervals the torque-to-current module 304, the field-oriented control module 318 and/or the electronic data processor (264, 298) are configured to operate in the first mode (e.g., primary braking mode) by determining (e.g., deriving or estimating) and injecting (e.g., applying) the respective commanded direct-axis current (e.g., to the driver or pulse width modulation module of the inverter switches) based on the corresponding quadrature-axis current.

Under a fourth technique in step S408, the torque-to-current module 304, the field-oriented control module 318 and/or the electronic data processor (264, 298) are configured to operate in the first mode (e.g., primary braking mode) by determining a commanded quadrature axis current to oppose or reduce the observed torque and to oppose or reduce observed speed consistent with the total available power loss or zero power braking curve. Next, the torque-to-current module 304, the field-oriented control module 318 and/or the electronic data processor (264, 298) are configured to operate in the first mode (e.g., primary braking mode) by determining (e.g., deriving or estimating) and injecting (e.g., applying) the respective commanded direct-axis current (e.g., to the driver or pulse width modulation module of the inverter switches) based on the corresponding commanded quadrature-axis current consistent with following equation for a surface magnet, alternating current electric machine:

$$I_d^* = -\sqrt{\frac{2T*\omega}{3} - \frac{3I_q^*}{2}},$$

where $I_d^*$ is the commanded direct-axis current (e.g., expressed in Amps) $T^*$ is the commanded torque, $\omega$ is the speed (e.g., mechanical or electrical speed expressed in radians per second) of the rotor of the electric machine, and $I_q^*$ is the commanded quadrature-axis current consistent with the with the total available power loss or zero power braking curve.

Under a fifth technique, in step S408 the zero power braking curves, inefficient MTPA curves, or inefficient MTPA operating points operate with increased ratio of respective commanded direct-axis current in the numerator to corresponding quadrature-axis current in the denominator than a reference ratio of a normal MTPA curve of normal MPTA operating points within a MTPA region, where the operating points, operational curves or regions may be defined in one or more look-up tables, database, inverted file, or other suitable data structure.

Under a sixth technique, in step S408 the zero power braking curves or available power loss are applied during braking or deceleration of the rotor (e.g., that are reduced by a total available power loss, a total power loss, or available power loss for a winding component of the electric machine (117, 217), to avoid overcharging a capacitor or other energy storage device on the DC bus). In one configuration, any total power loss, total available power loss, or available power loss for a winding component can be mapped to or modeled as an equivalent efficiency difference or relative efficiency decrease between the third mode (e.g., motoring mode) and the first mode (e.g., primary braking mode). For example, in the first mode (e.g., primary braking mode), the (target) efficiency, $E_m$, approaches or is equal to zero or zero percent, where $P_{loss}$ is approximately equal to or approaches $P_{in}$. Meanwhile, in the third mode (e.g., motoring mode, power generating mode or normal steady-state operational mode at a target speed of the rotor) the (target) efficiency $E_m$ is one or one-hundred percent.

Under a seventh technique, the inefficient MTPA curves or inefficient MTPA operating points may have the same or greater direct-axis current as the normal or efficient MTPA curves or MTPA operating points. For example, the inefficient MTPA curves or inefficient MTPA operating points control the commanded quadrature-axis currents to generate electrical power at the DC bus 350, but also to operate at a greater power losses that offset or reduce the generated electrical power at the DC bus 350.

Under an eighth technique for conducting step S408, during braking, the power losses are dissipated as electrical, thermal, and/or mechanical energy losses during one or more sampling intervals in the electric machine or electric motor.

Under a ninth technique in step S408, the torque-to-current module 304, the field-oriented control module 318 and/or the electronic data processor (264, 298) are configured to operate in the first mode (e.g., primary braking mode) by operating an electric motor in a first mode at an inefficient operating point or inefficient operating curve of a quadrature-axis current versus a direct-axis current such that the braking of the electric motor occurs based on, or at a deceleration rate proportional to (e.g., equal to or less than), total available power losses in the electric motor, the inverter, or both during a deceleration period.

Under a tenth technique in step S408, in the first mode of step S408 the torque-to-current module 304, the field-oriented control module 318 and/or the electronic data processor (264, 298) are configured to match or align a braking power of the electric machine (117, 277) or electric motor to (e.g., be proportional to, or equal to or less than) the total available power loss for the electric machine (117, 277) that comprises: a first available power loss component of one or more windings (671, 672, 673) of the electric machine (117, 277) or electric motor, a second available power loss component of the inverter (e.g., 550), and a third available power loss component of conductors or electrical cables that couple one or more alternating current terminals of the inverter (e.g., 550) to the windings of the electric machine (117, 277).

Under an eleventh technique in step S408, in the first mode of step S408 the torque-to-current module 304, the field-oriented control module 318 and/or the electronic data processor (264, 298) are configured to match or align a braking power of the electric machine (117, 277) or electric motor to (e.g., be proportional to, or equal to or less than) the total available power loss for the electric machine (117, 277) that comprises: a first available power loss component of one or more windings (671, 672, 673) of the electric motor, a second available power loss component of the inverter, and a third available power loss component of an electrical device coupled to a direct current (DC) bus of the inverter 550, wherein the electrical device comprises one or more of the following: an alternator coupled to a rectifier, a battery, a DC bus capacitor 18 or an ultracapacitor that provides DC energy to the inverter 550.

Under a twelve technique in step S408, in the first mode of step S408 the torque-to-current module 304, the field-oriented control module 318 and/or the electronic data processor (264, 298) are configured to match or align a braking power of the electric machine (117, 277) or electric motor to (e.g., be proportional to, or equal to or less than) the total available power loss for the electric machine (117, 277) that comprises one or more of the following: (1) a first available power loss component associated with sinking the rotational mechanical energy to the total available power loss in the electric machine, alone or in combination with the total available power loss of the inverter; and (2) a second available power loss component associated with regenerating power by rectifying some electrical energy from one or more windings (671, 672, 673) of the electric machine (117, 277) for application to a direct current (DC) bus or components coupled to the DC bus 350, where the components comprise a capacitor (17, 18), an ultracapacitor, a battery, a battery bank, a generator, or an alternator coupled to a rectifier. Further, the regenerating of power is limited based on or proportional to the load on the generator or alternator or load on the electrical system, where the load can be measured based on the power capacity or current capacity and the observed capacity utilization of the one or more components coupled to the DC bus 350.

In step S410, the torque-to-current module and/or the electronic data processor (264, 298) are configured to enable a multi-phase short signal (e.g., three-phase short signal) or data message to the field oriented control module to operate in the second mode (e.g., secondary braking mode, final braking mode or multi-phase-shorting mode). For example, once the second mode (e.g., secondary braking mode) is enabled, the field-oriented controller (675, 676) or electronic data processor (264, 298) is configured to apply a multi-phase short (e.g., three-phase short or an all-phase short) to the stator windings of the electric machine 117 (e.g., motor), via the driver or the pulse width modulation generation module 112 and via the inverter (188, 550).

Step S410 may be executed in accordance with various examples, which may be applied separately or cumulatively. Under a first example of conducting step S410 in the second mode, the multi-phase short circuit (e.g., three-phase short, two-phase short, single-phase short or all-phase short) may be a continuously applied phase-short circuit: (a) between two or more windings (671, 672, 673) of the electric machine (117, 277), or (b) between one or more windings (671, 672, 673) of the electric machine and electrical or chassis ground 351, or (c) both. Under a second example, the multi-phase short circuit (e.g., three-phase short or all-phase short) may be a pulsed or intermittently applied phase-short for one or more application periods: (a) between two or more windings (671, 672, 673) of the electric machine (117, 277), or (b) between one or more windings of the electric machine and electrical or chassis ground 351, or (c) both.

Under a third example of conducting step S410 in the second mode, the torque-to-current module and/or the electronic data processor (264, 298) are configured to enable the multi-phase, short-circuit (e.g., three-phase short circuit or the all-phase short) by switching on (e.g., activating the switch to conduct between the switched terminals for a normally off switch) continuously the low-side switches 283 of the inverter 550 and by simultaneously switching off the high-side switches 282 of the inverter 550.

Under a fourth example of conducting step S410 in the second mode, the torque-to-current module and/or the electronic data processor (264, 298) are configured to enable the multi-phase short circuit (e.g., three-phase short or the all-phase short) by switching on (e.g., activating continuously the switch to conduct between the switched terminals for a normally off switch) the low-side switches 283 of the inverter 550 and by simultaneously switching off the high-side switches 282 of the inverter 550.

Under a fifth example of conducting step S410 in the second mode, the torque-to-current module and/or the electronic data processor (264, 298) are configured to enable the multi-phase short circuit (e.g., three-phase short or the all-phase short) by applying a multi-phase short circuit via the winding terminals (671, 672, 673) of the electric machine (117, 277) to bring the electric machine (117, 277) to a target speed or velocity. For instance, the target speed may comprise a zero target speed magnitude, stop, or rest state of the rotor or shaft of the electric machine (117, 277).

Under a sixth example of conducting step S410, the torque-to-current module and/or the electronic data processor (264, 298) are configured to comprise a second mode that follows the first mode, where the first mode comprises a preliminary braking mode or matched-loss-to-power braking mode of step S408.

Under a seventh example of conducting step S410 and as illustrated in FIG. 5B, a ground switch module 451 comprises a supplemental switch 674 (e.g., transistor) is coupled in series, alone or together with a resistor (e.g., current-limiting resistor), between the (negative) DC bus terminal 350 and the ground (351, 677); the torque-to-current module and/or the electronic data processor (264, 298) is configured to activate the supplemental switch 674 to connect or couple electrically one or more windings (671, 672, 673) of the electric machine (117, 277) to electrical or chassis ground 351.

The output of commanded direct-axis current and commanded quadrature-axis current are provided to a current controller (e.g., 675, 676), such as a PID (proportional integral derivative) controller that outputs a corresponding commanded direct-axis voltage and a commanded quadrature-axis current to operate in the first mode (e.g., primary braking mode) or the third mode (e.g., motoring mode, power generating mode, or steady-state normal operation at a target torque or target speed).

As used in FIG. 4, any steps that are executed by the data processing system 120 may be executed by the data processor 264, whether by execution of software instructions (e.g., primary processing module) stored in the data storage device 260 on a permanent or non-transitory basis, or otherwise.

Figure 6:
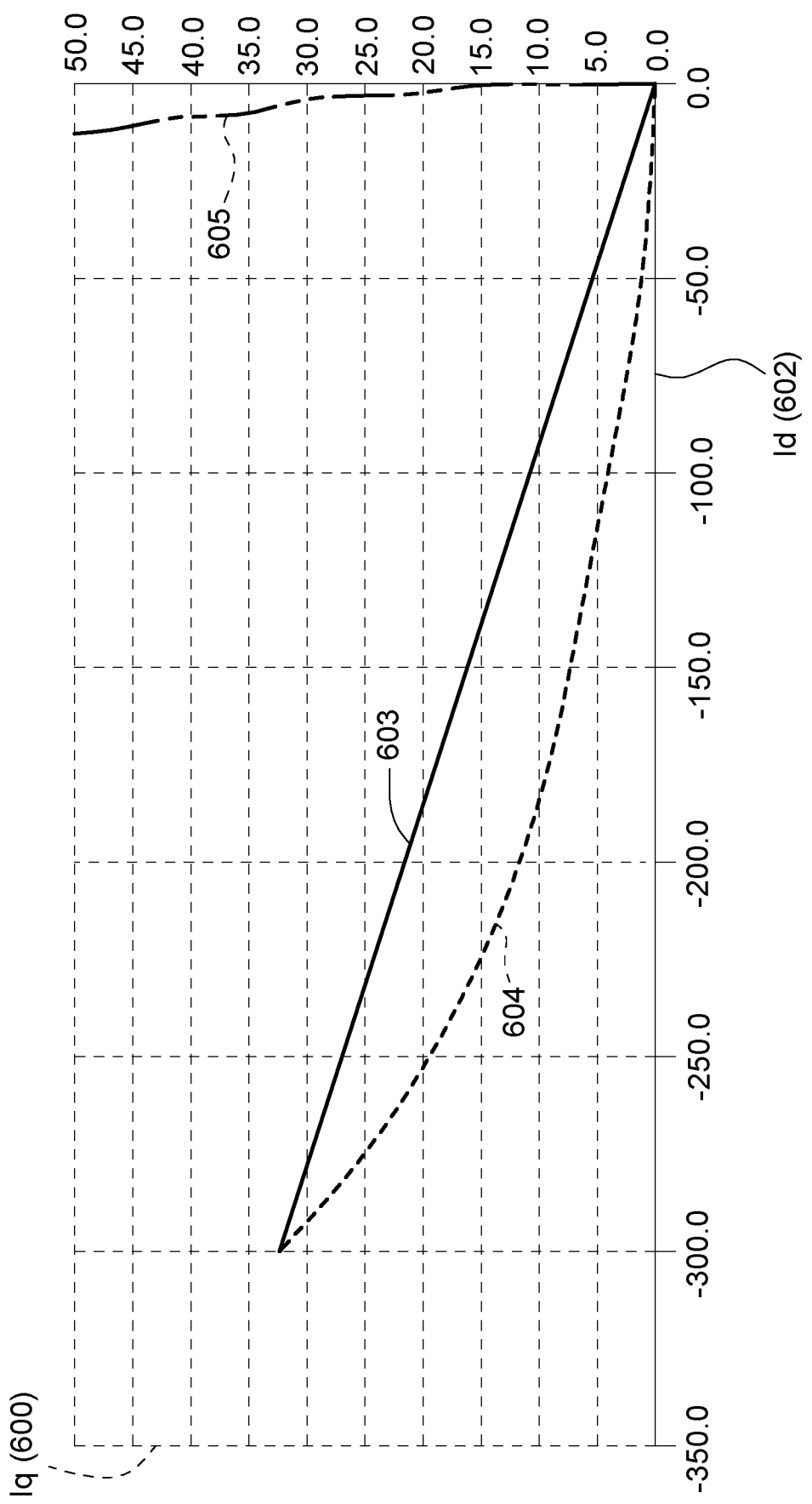
FIG. 6 shows a graph of an efficient or normal operational curve (e.g., in the third mode) versus an inefficient operational curve (e.g., in the first mode) for the electric machine.

FIG. 6 shows a graph of an efficient operational curve (e.g., in the third mode, such as motoring mode) versus an inefficient operational curve (e.g., in the first mode, such as a braking mode) for the electric machine. In FIG. 6, the horizontal axis represents the direct-axis current 602, such as the commanded direct-axis current (Id*), whereas the vertical axis represents the quadrature-axis current 600, such as the commanded quadrature-axis current (Iq*).

The solid line represents an efficient operating curve 603 of a quadrature-axis current versus a direct-axis current, or an operating point on the efficient curve 603. The dashed line represents an inefficient operating curve 604 of a quadrature-axis current versus a direct-axis current, or an operating point on the inefficient curve 604. For any given value of commanded quadrature-axis current, the inefficient operating curve 604 provides less torque output (e.g., observed torque) and/or less speed output 605 (e.g., observed rotor speed) of the electric machine than the corresponding efficient operating curve 603 because of increased power losses ($P_{loss}$) of the electric machine (e.g., or an equivalent reduced efficiency ($E_m$) of the electric machine in the first mode (e.g., preliminary braking mode) with respect to the third mode (e.g., motoring mode, power generating mode or normal The following is claimed:

1. A method of controlling braking of a rotor of an electric motor, the method comprising:
    based on a measured speed and a speed command, determining a commanded torque for a first mode for operation of the electric motor, wherein an inverter is coupled to the electric motor;
    operating the electric motor in the first mode based on the commanded torque, the first mode configured to operate the electric motor based on an operating curve of a quadrature-axis current versus a direct-axis current such that the braking of the electric motor occurs based on a total available power loss in the electric motor during a deceleration period at a first speed, wherein a deceleration rate is proportional to a power loss of the electric motor; and
    based on a determination that an observed rotor speed of the electric motor is at a second speed that is less than or equal to a threshold speed magnitude, applying a multi-phase short circuit via winding terminals of the electric motor to cause the electric motor to reach a third speed, wherein the second speed is greater than the third speed and less than the first speed, and wherein the multi-phase short circuit is applied to the winding terminals to oppose mechanical rotation of the rotor for a duration of time corresponding to an amount of electrical energy remaining in the winding terminals.

2. The method according to claim 1, wherein the third speed includes a zero target speed magnitude and the applying of the multi-phase short circuit brings the rotor or a shaft of the electric motor to a stop.

3. The method according to claim 1, wherein the first mode includes a preliminary braking mode or a matched-loss-to-braking-power mode, wherein a second mode includes the multi-phase short circuit as a secondary braking mode that follows the first mode.

4. The method according to claim 1, wherein the deceleration rate includes a target speed difference between the observed rotor speed and a commanded rotor speed for a respective time interval, where the observed rotor speed approaches a target magnitude speed or a zero magnitude speed over successive time intervals to manage or limit thermal energy dissipated within the electric motor during the successive time intervals.

5. The method according to claim 1, wherein the deceleration rate includes a target torque difference between an observed rotor torque and a commanded rotor torque for a respective time interval that approaches a zero magnitude speed over successive time intervals to manage or limit thermal energy dissipated within the electric motor and the inverter during the successive time intervals.

6. The method according to claim 1, wherein, in the first mode, matching or aligning a braking power of the electric motor to the total available power loss for the electric motor includes an available power loss component of one or more of the winding terminals of the electric motor.

7. The method according to claim 1, wherein the applying of the multi-phase short circuit includes activating a plurality of low-side switches of each phase of the inverter, where the plurality of low-side switches are activated for a target duration such that an electrical path from each phase winding to one or more other phase windings is provided for the target duration to dissipate at least some portion of the electrical energy in such phase winding.

8. The method according to claim 1, wherein the applying of the multi-phase short circuit includes selectively activating or pulsing a plurality of low-side switches of each phase of the inverter, where each low-side switch among the low-side switches is activated or pulsed in sequence to bring the electric motor to a target speed magnitude or a target velocity of the rotor or a motor shaft.

9. The method according to claim 8, wherein the third speed includes a zero target speed or a stop within a target time period based on a maximum operational speed.

10. The method according to claim 1, wherein the multi-phase short circuit is a second mode, and in the second mode, the commanded torque is set to zero or a braking torque such that an electrical rotational speed or a mechanical rotational speed approaches zero during a stopping time.

11. The method according to claim 1 wherein, in the first mode, matching or aligning a braking power of the electric motor to the total available power loss of the electric motor includes a first available power loss component of one or more of the winding terminals of the electric motor, a second available power loss component of the inverter, and a third available power loss component of conductors or electrical cables that couple one or more alternating current terminals of the inverter to the winding terminals of the electric motor.

12. The method according to claim 1, wherein, in the first mode, matching or aligning a braking power to the total available power loss of the electric motor includes a first available power loss component of one or more of the winding terminals of the electric motor, a second available power loss component of the inverter, and a third available power loss component of an electrical device coupled to a direct current (DC) bus of the inverter, wherein the electrical device provides DC energy to the inverter.

13. The method according to claim 1, wherein, in the first mode, matching or aligning a braking power of the electric motor to the total available power loss of the electric motor includes one or more of the following:
    a first available power loss component associated with sinking rotational mechanical energy to the total available power loss in the electric motor, alone or in combination with the total available power loss of the inverter; and
    a second available power loss component associated with regenerating power by rectifying some electrical energy from one or more winding terminals of the electric motor for application to a direct current (DC) bus or one or more components coupled to the DC bus.

14. The method according to claim 13, wherein the regenerating power is limited based on or proportional to load on a generator or an alternator or load on an electrical system, where the load can be measured based on power capacity or current capacity and an observed capacity utilization of the one or more components coupled to the DC bus.

15. A non-transitory machine-readable storage medium comprising instructions that, when executed by one or more processors, cause the one or more processors to execute the instructions to:
    based on a measured speed and a speed command, determine a commanded torque for a first mode of operation of an electric motor, wherein an inverter is coupled to the electric motor;
    operate the electric motor in the first mode based on the commanded torque, the first mode configured to operate the electric motor based on an operating curve of a quadrature-axis current versus a direct-axis current such that braking of the electric motor occurs based on a total available power loss in the electric motor during a deceleration period at a first speed, wherein a deceleration rate is proportional to power loss of the electric motor; and based on a determination that an observed rotor speed of the electric motor is at a second speed that is less than or equal to a threshold speed magnitude, apply a multi-phase short circuit via winding terminals of the electric motor to cause the electric motor to reach a third speed, wherein the second speed is greater than the third speed and less than the first speed, and wherein the multi-phase short circuit is applied to the winding terminals to oppose mechanical rotation of a rotor for a duration of time corresponding to an amount of electrical energy remaining in the winding terminals.

16. The non-transitory machine-readable medium of claim 15, wherein the third speed includes a zero target speed magnitude, and the one or more processors are to execute the instructions to apply the multi-phase short circuit to bring the rotor or a shaft of the electric motor to a stop.

17. The non-transitory machine-readable medium of claim 15, wherein the first mode includes a preliminary braking mode or a matched-loss-to-braking-power mode, wherein a second mode includes the multi-phase short circuit as a secondary braking mode that follows the first mode.

18. The non-transitory machine-readable medium of claim 15, wherein the deceleration rate includes a target speed difference between the observed rotor speed and a commanded rotor speed for a respective time interval, where the observed rotor speed approaches a target magnitude speed or a zero magnitude speed over successive time intervals to manage or limit thermal energy dissipated within the electric motor during the successive time intervals.

19. The non-transitory machine-readable medium of claim 15, wherein the deceleration rate includes a torque difference between an observed rotor torque and a commanded rotor torque for a respective time interval that approaches a zero magnitude speed over successive time intervals to manage or limit thermal energy dissipated within the electric motor and the inverter during the successive time intervals.

20. The non-transitory machine-readable medium of claim 15, wherein, in the first mode, matching or aligning a braking power of the electric motor to the total available power loss for the electric motor includes an available power loss component of one or more winding terminals of the electric motor.

* * * * *